United States Patent [19]

Mimura et al.

[11] Patent Number: 5,548,346

[45] Date of Patent: Aug. 20, 1996

[54] APPARATUS FOR INTEGRALLY CONTROLLING AUDIO AND VIDEO SIGNALS IN REAL TIME AND MULTI-SITE COMMUNICATION CONTROL METHOD

[75] Inventors: Itaru Mimura, Sayama; Hirotada Ueda, Kokubunji; Shigeo Sumino, Chofu; Mitsuru Ikezawa, Kodaira; Toshiaki Suzuki, Musashino; Taizo Kinoshita, Tachikawa; Katsumi Tada, Yokohama, all of Japan

[73] Assignee: Hitachi, Ltd., Tokyo, Japan

[21] Appl. No.: 336,646

[22] Filed: Nov. 4, 1994

[30] Foreign Application Priority Data

Nov. 5, 1993 [JP] Japan .................................. 5-276477
Dec. 6, 1993 [JP] Japan .................................. 5-305129

[51] Int. Cl.[6] ........................................................ H04N 5/60
[52] U.S. Cl. .......................... 348/738; 348/462; 348/484; 348/722; 348/15
[58] Field of Search .............................. 348/15, 462, 465, 348/473, 484, 485, 480, 481, 482, 483, 722, 738, 632, 633, 515; H04N 5/60, 7/08

[56] References Cited

U.S. PATENT DOCUMENTS 4,907,082 3/1990 Richards .................................. 348/738
4,964,162 10/1990 McAdam ................................. 348/481
5,389,976 2/1995 Miyagawa ............................... 348/738

FOREIGN PATENT DOCUMENTS 60-203086 10/1985 Japan .
61-10381 1/1986 Japan .
63-77282 4/1988 Japan .

*Primary Examiner*—Safet Metjahic
*Assistant Examiner*—Sherrie Hsia
*Attorney, Agent, or Firm*—Antonelli, Terry, Stout & Kraus

[57] ABSTRACT

A real time visual communication system capable of improving a correspondence between a received video signal and a received audio signal in real time and improving reality. An AV signal is separated into a video signal and an audio signal, and the output state of the video or audio signal is controlled by the characteristics of the audio or video signal. For example, the sound field, reverberation, and the like are controlled in accordance with the characteristics of the video signal. A suitable image pickup unit is selected in accordance with the characteristics of the audio signal to make the sights of conversation participants coincide with each other. It is possible to reproduce sounds of audio signals well matching video signals and to provide visual communication having good reality because of the combination of matched audio and video signals.

25 Claims, 35 Drawing Sheets

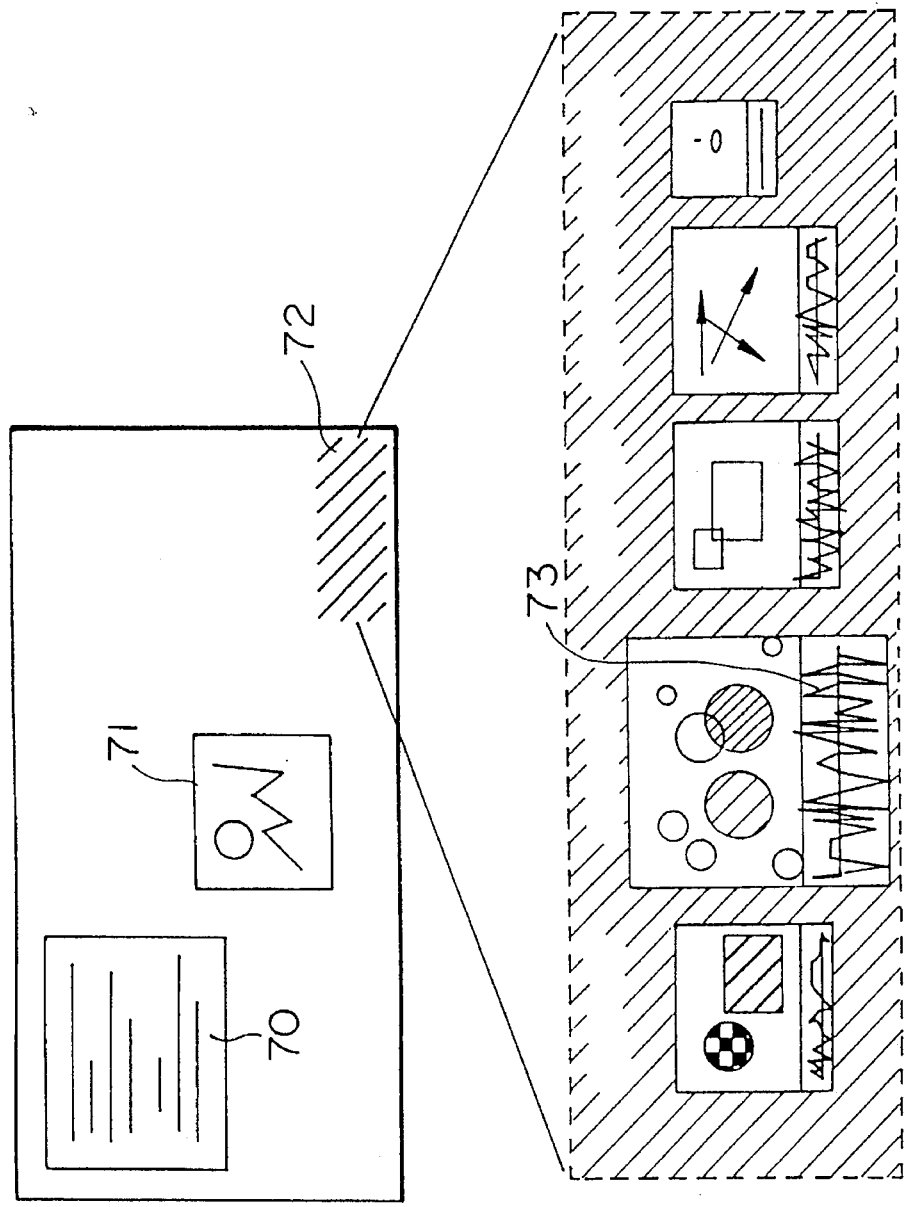

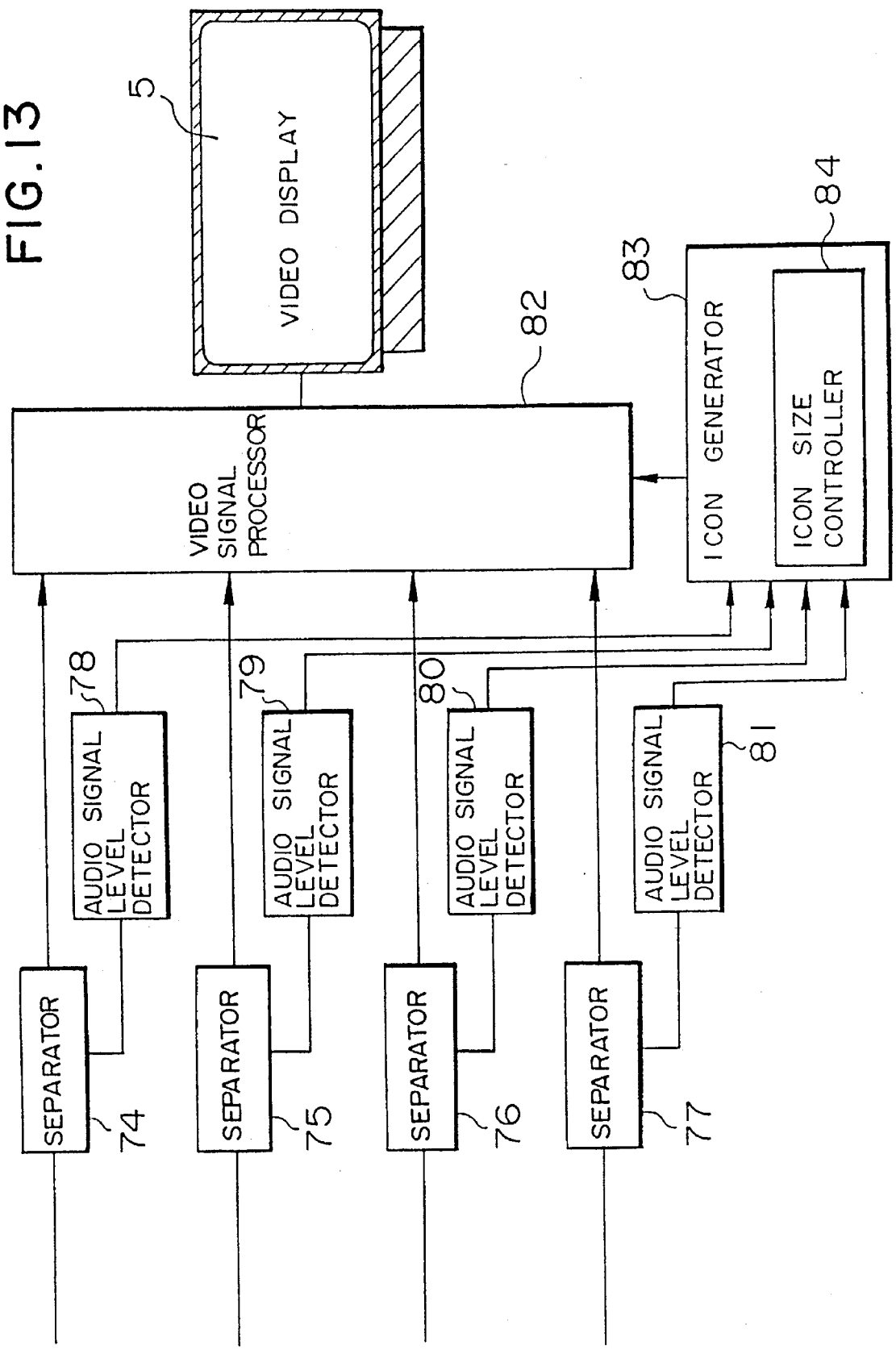

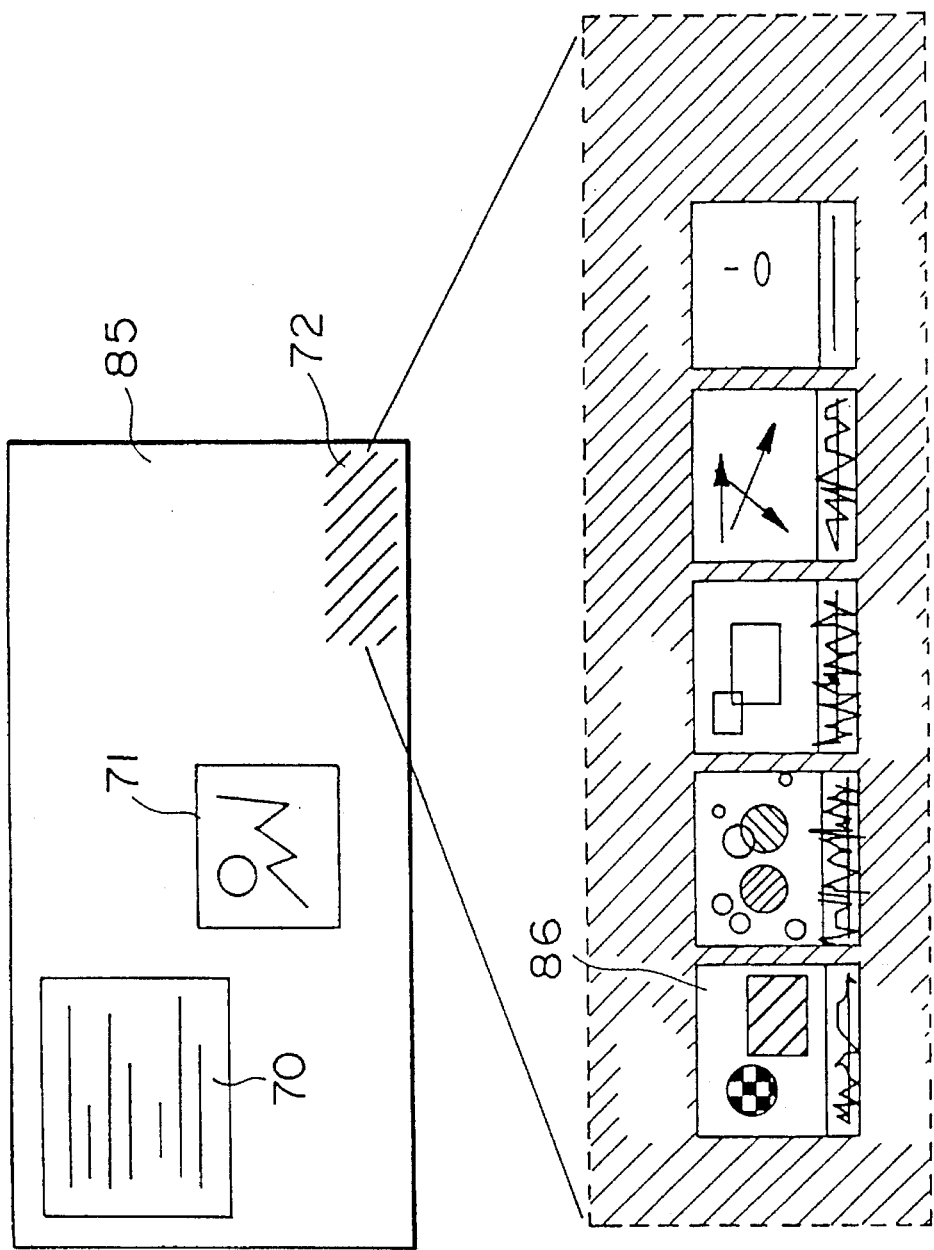

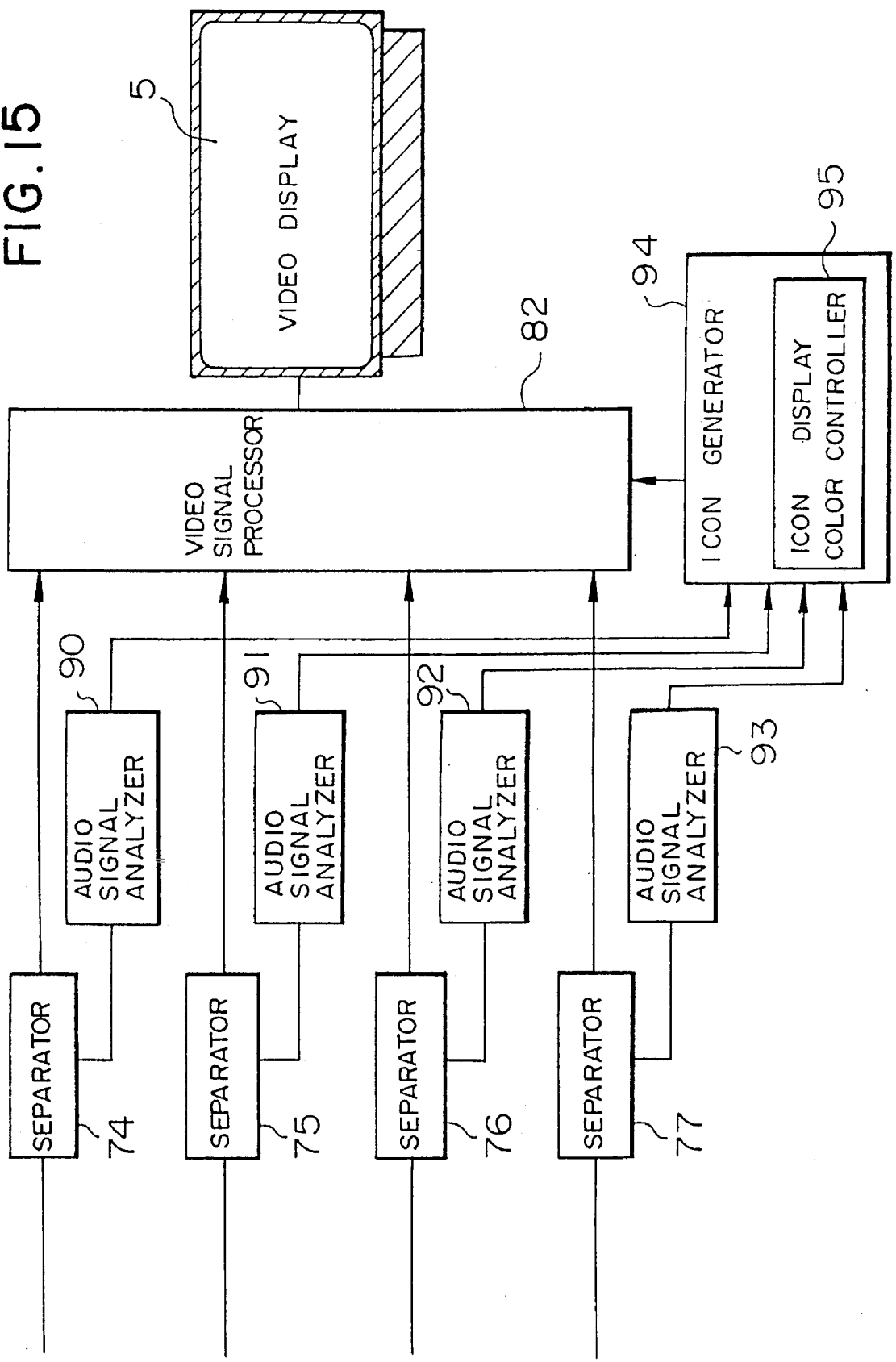

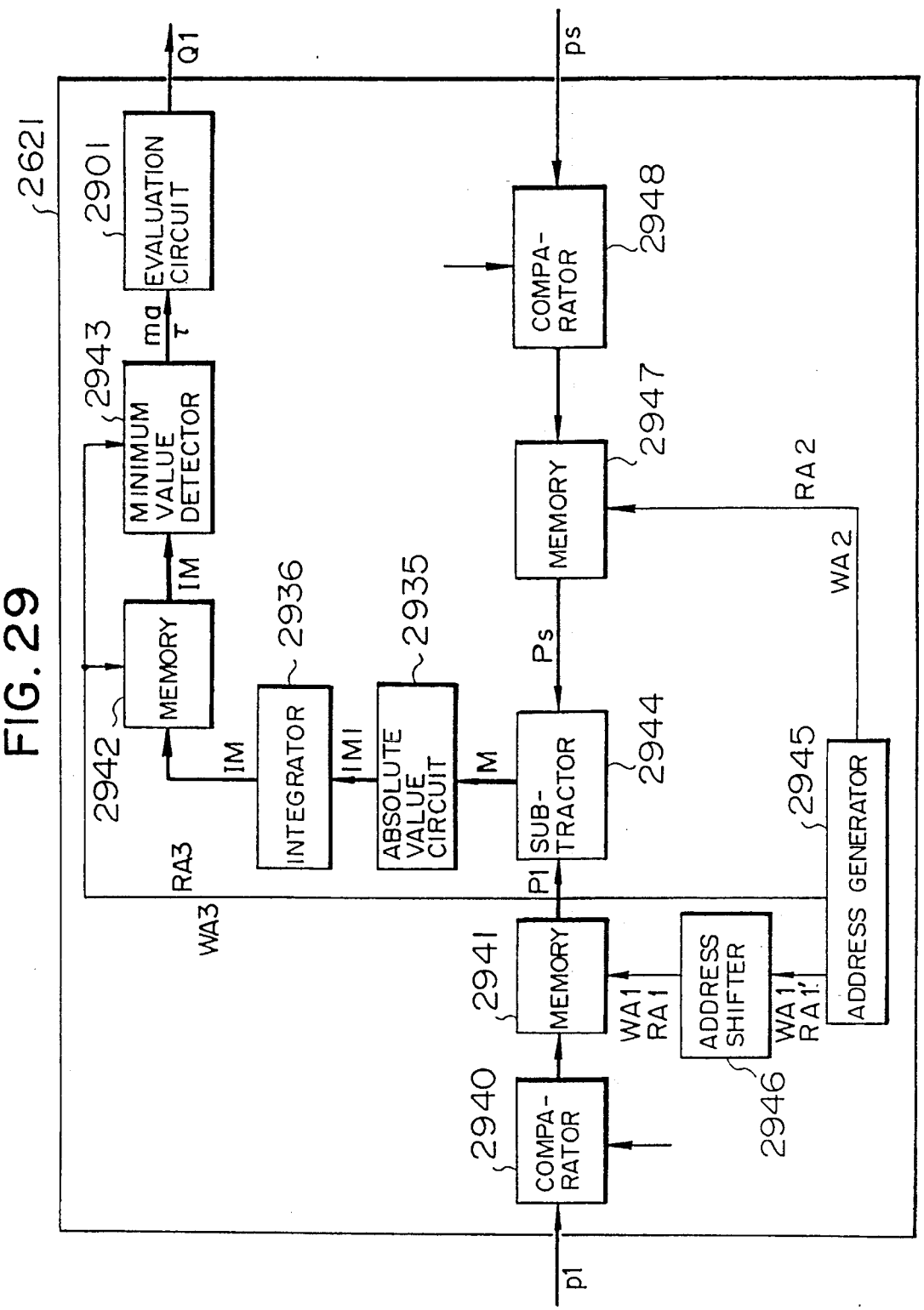

APPARATUS FOR INTEGRALLY CONTROLLING AUDIO AND VIDEO SIGNALS IN REAL TIME AND MULTI-SITE COMMUNICATION CONTROL METHOD

BACKGROUND OF THE INVENTION

1. Field of the Invention

The present invention relates to an apparatus for integrally controlling audio and video signals for systems such as TV conferencing systems and visual telemetry systems in which audio and video signals transmitted from a spatially remote site are used to reproduce scenes rich in reality. More particularly, the invention relates to an apparatus for integrally controlling audio and video signals by analyzing received video signals and controlling audio signal processing parameters in accordance with the analyzed results.

2. Description of the Related Art

As video systems for transmitting audio and video signals from a spatially remote site, movies and televisions are known which have been in practical use from old days. Techniques of movies and televisions are well known and the details thereof are omitted. Only the effects of a combination of audio and video signals are given herein. Basic sound signals for a movie or a television are recorded simultaneously when a scene is taken. After scenes are taken, the basic sound signals are repetitively edited and processed while looking at the scenes to generate audio signals matching the scenes. Editing and processing include an addition of effect sounds and new sounds after recording and an adjustment of quality and volume of recorded sounds. An object of editing is to improve reality. It is well known that reality improves if high quality audio signals matching the contents of scenes are used. For example, a movie of a surround stereophonic sound system in which sound images move following a motion of scene images, provides excellent reality more than a movie of a monophonic sound system.

Audio signals cannot be repetitively edited or processed while audio and video signals of a movie or a television are transmitted in real time from a spatially remote site, being unable to provide excellent reality such as described above.

As full-duplex visual communication systems, TV conferencing systems have been in practical use. In a TV conferencing system, audio and video signals recorded by a microphone and a camera (hereinafter a video signal containing an audio signal is represented by an AV signal where applicable) are transmitted to a remote site via communication networks, and images and sounds of scenes are reproduced on a display unit and from a loudspeaker. Microphones, cameras, display units, and loudspeakers are prepared at respective communication sites which are interconnected by communication networks to realize full-duplex and multi-site communications. As simplex visual communication systems, there are a visual telemetry system in which scenes at a remote site are monitored by using AV signals and a telepresence system in which a user has a virtual experience as if presenting at a remote site by looking at images and listening sounds at the remote site. Such TV conferencing systems, visual telemetry systems, and tele presence systems are real-time visual communication systems by which present events are recorded by a TV camera and a microphone and transmitted to a destination with high fidelity. Recently, a system called an easy-to-use computer supported cooperative work (CSCW) has become available in which images transmitted in real time and computer graphics generated by a computer are displayed at the same time.

FIG. 37 is a schematic diagram showing an example of a conventional multi-site, individual-type TV conferencing system.

In this multi-site TV conferencing system S51, AV signals are transmitted among TV conferencing sites (A to E) 3751 to 3755 via a communication network 3756, each site being equipped with a TV conferencing apparatus for each of participants A to E.

FIG. 38 is a schematic diagram showing the configuration of, for example, the TV conferencing apparatus at E site 3755.

The TV conferencing apparatus at E site 3755 has a camera 3862, a microphone 3869, a display unit 3801, and loudspeakers 3860 and 3861.

The camera 3862 takes an image of the participant E at the TV conferencing site E and its video signal is transmitted to the other TV conferencing sites (A to D) 3751 to 3754. The microphone 3869 records voices of the participant E and its audio signal is transmitted to the other TV conferencing sites (A to D) 3751 to 3754.

In windows 2564 to 2567 of the display nit 3801, the images of the participants A to D at the other TV conferencing sites (A to D) 3751 to 3754 are displayed. Voices of the participants A to D at the other TV conferencing sites (A to D) 3751 to 3754 are synthesized and reproduced from the loudspeakers 3860 and 3861.

With conventional TV conferencing systems and visual telemetry systems, a correspondence between audio and video signals becomes poor in some cases because a conference room or a space in which an object to be monitored does not always satisfies the sound recording conditions matching scene images. For example, consider zoom-up of the image of a speaker at a TV conferencing system. In order to realize a good correspondence between audio and video signals during an image zoom-up operation, it is necessary, for example, for a microphone to move and record speeches near at the speaker at the same time when a camera is moved for the zoom-up operation, and for a sound recording area to coincide with an image taking area. However, in practice, it is impossible for a conventional system to move a microphone near to a speaker. Therefore, even if the image of a speaker is zoomed up, the sound volume does not change and the AV signal having a poor correspondence is transmitted to a communication partner. Such an AV signal reproduced at the destination provides low reality hindering a smooth progress of a conference. For example, if a conference is progressed always with voices from a far field, it is easily conceivable that the conference does not become attractive and its smooth progress is difficult.

In addition to a poor correspondence between audio and video signals, there is a poor correspondence between video signals. This will be explained in the following.

FIGS. 39A and 39B are schematic diagrams explaining the states at the TV conferencing sites (A and E) 3755 and 3751 of the conventional TV conferencing system S51 wherein participants E and A at the TV conferencing sites (E and A) 3755 and 3751 have a conversation.

As shown in FIG. 39A, at the TV conferencing site E 3755, the participant A is displayed in the leftside window 2564 of the display unit 3801 and the participant E looks at the window 2564. Therefore, an angle θ between a sight of the participant E and the optical axis of the camera 3862 becomes large.

As shown in FIG. 39B, at the TV conferencing site A 3751, the participant E is displayed in the rightside window 2567 of the display unit 3801 and the participant A looks at the window 2567. Therefore, an angle θ between a sight of the participant A and the optical axis of the camera 3862 becomes large.

The participants E and A feel therefore that the partner is not looking at him or her, losing reality of discussion in the conference room.

As described above, with the conventional TV conferencing system S51, conversation partners (speakers and listeners) are not displayed clearly and distinguishably and reality cannot be produced.

JP-A-61-10381 discloses a technique of selectively transmitting only an image of a participant not speaking.

JP-A-60-203086 discloses a technique of displaying an enlarged image of a participant now speaking.

JP-A-63-77282 discloses a technique of changing the direction of a camera toward a participant now speaking.

These conventional techniques are related to application techniques of apparatuses on the speaker side. In a TV conference, reality can be obtained if conversation partners (speakers and listeners) are displayed clearly and distinguishably. Any one of the conventional techniques cannot display clearly and distinguishably conversation partners, being unable to provide sufficient reality.

If a correspondence between audio and video signals is poor in a monitor operation of a visual telemetry system (e.g., if audio signals unnecessary for video signals are reproduced), these unnecessary audio signals may cause an overlook of an instrument and an erroneous decision of occurrence of an event.

As apparent from the description of editing sounds of a television or a movie, editing and processing of sounds are performed in order to improve the correspondence between audio and video signals and improve reality. However, conventional real-time visual communication systems such as TV conferencing systems and visual telemetry systems do not record and process sounds and images after they have once recorded and processed, being unable to provide a conference with good reality and a correct and speedy monitor operation.

SUMMARY OF THE INVENTION

It is a first object of the present invention to provide an apparatus for a real-time visual communication system such as TV conferencing systems, visual telemetry systems, and telepresence systems, capable of improving a correspondence between audio and video signals and realizing AV communication with good reality.

It is a second object of the present invention to provide an excellent and easy-to-use user interface by processing audio signals contained in video signals.

It is a third object of the present invention to provide a multi-site communication method and a communication terminal capable of clearly and distinguishably displaying conversation partners (speakers and listeners) and improving reality.

In order to achieve the above objects of the invention, a video signal is analyzed and an audio signal is processed in real time in accordance with the analyzed results. An AV communication system of this invention includes means for analyzing a video signal and deriving characteristics of an image, database means for storing audio signal processing parameters corresponding to the image characteristics, and audio signal processing means for controlling an audio signal in accordance with parameters read from the database.

Specifically, according to the present invention, the apparatus for integrally controlling an audio signal and a video signal in real time, is realized by: a separator for receiving a video signal and an audio signal synchronous with the video signal and separating the received signals into the audio and video signals; a display unit for displaying the video signal; a sound output unit for outputting a sound of the audio signal; and control means for controlling the output state of one of the audio and video signals in accordance with the other of the audio and video signals.

The control means includes a video analyzer for analyzing the video signal, and a table for storing the relationship between an output from the video analyzer and the output state of the audio signal, whereby the sound output unit is controlled by an output from the table.

The control means includes an audio signal analyzer for analyzing the audio signal, and a table for storing the relationship between an output from the audio signal analyzer and the output state of the video signal, whereby the display unit is controlled by an output from the table.

The control means includes means for controlling to change the video signal to an icon and display the icon on the display unit, and a table for storing the relationship between a level of the audio signal and a display size of the icon.

The control means includes means for controlling to change the video signal to an icon and display the icon on the display unit, and a table for storing the relationship between a level of the audio signal and a display color of the icon.

In applying the invention to a multi-site TV conferencing system, the apparatus further includes a microphone and image pickup means, wherein a composite signal of the video signal and the audio signal synchronous with the video signal is received via a network interconnecting communication terminals at other sites, and the control means includes correlation analyzing means for analyzing a correlation between the audio signal supplied from the network and the audio signal obtained from the microphone, and controls the display unit, the sound output unit, and the image pickup means, in accordance with an output from the correlation analyzing means.

The control means controls an image pickup angle of the image pickup means.

The apparatus further includes a plurality of sound output units, wherein the control means controls the balance of reproduced sounds of the plurality of sound output units to orientate a sound field to a display screen area at which the video signal synchronizing the audio signal having a largest correlation is displayed.

The display unit displays the composite signal of the video signal and the audio signal synchronous with the video signal in a window, and the control means controls the balance of reproduced sounds of the plurality of sound output units and controls to display, in a different manner from an ordinary state, a window in which the video signal synchronizing the audio signal having a largest correlation is displayed.

A multi-site communication system having a good correspondence between video systems is realized by the following methods and apparatuses.

The invention provides a multi-site communication method for a multi-site communication system having a plurality of communication terminals at different sites interconnected by a communication network for transmitting an audio signal and a video signal between the communication terminals, wherein correlations between the audio signal generated at one communication terminal and the audio signals generated at other communication terminals are analyzed, and a conversation partner of the one communication terminal is identified from the other communication terminals in accordance with the correlation analyzed result.

The invention provides the multi-site communication method, wherein the one communication terminal includes a display unit for displaying images received from the other communication terminals at predetermined display positions and a plurality of cameras disposed near at the predetermined display positions for taking the images of participants at the other communication terminals, and wherein the video signal recorded by the camera near the predetermined display position corresponding to the identified conversation partner is selected and transmitted at least to the communication terminal of the identified conversation partner.

The invention provides the multi-site communication method, wherein the display state of an image is controlled in accordance with the conversation partner identified result.

The invention provides a communication terminal connected to a plurality of other communication terminals at different sites via a communication network for transmitting and receiving an audio signal and a video signal to and from the plurality of other communication terminals. The communication terminal includes: correlation analyzing means for analyzing correlations between the audio signal to be transmitted to another communication terminal at another site and the audio signal received from another communication terminal at another site; and conversation partner identifying means for identifying another communication terminal of a conversation partner in accordance with the correlation analyzed result.

The invention provides the communication terminal, further including: a display unit for displaying images received from the other communication terminals at predetermined display positions; a plurality of cameras disposed near at the predetermined display positions for taking the images of participants at the other communication terminals; and video signal selecting means for selecting the video signal recorded by the camera near the predetermined display position corresponding to the identified conversation partner.

The invention provides the communication terminal further including video controlling means for controlling the display state of an image in accordance with the conversation partner identified result.

The invention provides the communication terminal further including conversation partner identified result transmitting means for transmitting the conversation partner identified result to the other communication terminals via the communication network.

The invention provides the communication terminal connected via the communication network to a plurality of communication terminals including the communication terminal recited just above further including: conversation partner identified result receiving means for receiving the conversation partner identified result from the communication network; and video signal decoding control means for controlling the contents of decoding the video signal in accordance with the received identified result.

The invention provides the communication terminal recited just above further including video signal encoding control means for controlling the contents of encoding the video signal in accordance with the conversation partner identified result.

The apparatus of this invention analyzes the characteristics of an input video signal such as chrominance, frequency distribution, luminance histogram, motion quantity per unit time, and motion direction. In accordance with these analyzed characteristics, the contents of a subject image are predefined. The predefined contents and derived characteristics of video signals are stored in the database as a search key. Also stored in the database are audio signal processing parameters in correspondence with the contents and characteristics of video signals. Processing parameters suitable for an image are read from the database and supplied to the audio signal processor which changes its processing characteristics in accordance with the parameters to change the audio signal. For example, the sound field is controlled to reproduce an acoustic space suitable for an image, by changing the sound volume, right and left balance, frequency characteristics, reverberation, and the like. Audio signal processing parameters suitable for improving reality are stored in advance in the database, and parameters suitable for each image are read therefrom. It is therefore possible to always reproduce sounds matching each image, providing TV conferencing systems, visual telemetry systems, and the like which are excellent in reality. If parameters like those used by professional acoustic operators are stored in the database, the same effects of real time acoustic editing can be obtained.

The audio signal processor may be controlled in accordance with not only the video signal characteristics but also user preference. Audio signal processing parameters may be controlled through a user interface unit of a computer system.

In a multi-site communication system, video signals are used for the operations described in the following.

Since a conversation progresses with some delay between each partner, there is a large correlation between states of audio signals given by conversation partners, whereas there is a small correlation between states of audio signals given by partners not participating the conversation. Conversation participants (speaker and its partner) can be identified by analyzing correlations.

An image of a speaker is taken by a camera positioned near the window displaying the image of a partner (listener) so that the sights of both participants coincide with each other and reality can be improved.

Reality can further be improved by displaying the images of conversation participants differently from other persons.

A conversation partner identified result is transmitted over the communication network to another communication terminal. Therefore, even at a communication terminal not participating the conversation, conversation participants can be identified. By using the conversation partner identified result, it is possible to display the images of conversation participants differently from other persons, further improving reality.

According to the present invention, an audio signal is processed properly by analyzing the characteristics of a video signal, thereby forming a audio-video signal space excellent in reality. By adding an audio signal matching a video signal to the latter, it is possible to configure an audio-video system not only having improved reality but also being easy-to-use.

In a multi-site communication system to which the invention is applied, conversation participants can be identified, thereby providing reality of as if the participants are discussing in the same conference room.

BRIEF DESCRIPTION OF THE DRAWINGS

FIG. 12 is a schematic diagram showing an example of a screen with icon sizes being controlled by a sound volume.

FIG. 13 is a block diagram showing the structure of an embodiment with icon sizes being controlled by a sound volume.

FIG. 14 is a schematic diagram showing an example of a screen with icon sizes being controlled by a tone of an audio signal.

FIG. 15 is a block diagram showing the structure of an embodiment with icon size being controlled by a tone of an audio signal.

FIG. 29 is a block diagram showing the structure of a correlation detector.

DESCRIPTION OF THE PREFERRED EMBODIMENTS

Embodiments of the invention will be described with reference to the accompanying drawings.

Figure 1:
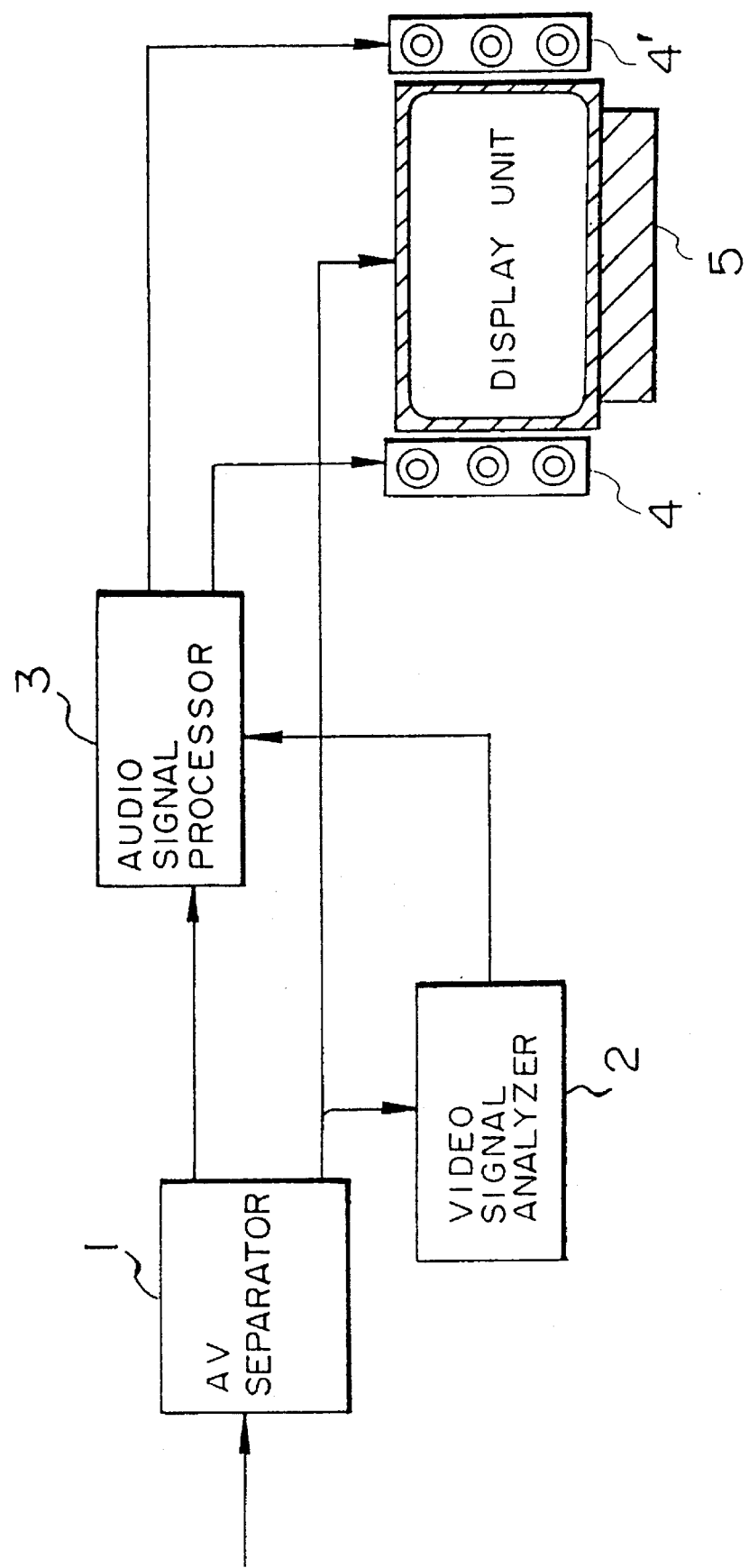
FIG. 1 is a block diagram showing the structure of an embodiment of the invention.

FIG. 1 is a system block diagram showing an embodiment of the present invention. The apparatus of this embodiment is constituted by an AV (audio/video) separator 1 for separating a video signal and an audio signal synchronized with the former, a video signal characteristic analyzer 2 for analyzing the characteristics of a video signal, an audio signal processor 3 for processing an audio signal, a display unit 5 for displaying images represented by a video signal, and loudspeakers 4, 4' for reproducing processed audio signals. Next, the flow of AV signals and operation of the embodiment apparatus will be described. An AV signal transmitted from a remote site is inputted to the AV separator 1 which separates it into an audio signal and a video signal. The separated audio signal is supplied to the audio signal processor 3, and the separated video signal is supplied to the video signal analyzer 2 and to the video display unit 5. The video signal analyzer 2 analyzes the characteristics of an inputted video signal, and in accordance with the analyzed characteristics, generates a control signal for controlling the audio signal processor 3. The operation of the audio signal processor 3 to be later described includes, for example, an operation of improving a clarity of voices if a transmitted image indicates a conversation between participants, an operation of providing an expansion of sounds if an image shows a broad outdoors, an operation of adding reverberation signals if an image shows a broad indoors such as a hall, and an operation of orientating sound images following a motion of an image if the image is a moving image. These effects can be realized as follows. For improving a speech clarity, a balance between higher and lower frequencies of an audio signal is adjusted by a filter. For adding reverberation, a convolution calculation for calculating desired reverberation times is performed. For localizing a sound image following a moving image, a sound volume balance between a plurality of loudspeakers and a balance between direct sounds (sounds directly received by a listener without reflection from a wall or the like) and reflected sounds (sounds reflected by a wall or the like and having a phase delay and frequency change) are adjusted following a motion of a sound generating object in the image.

Figure 2:
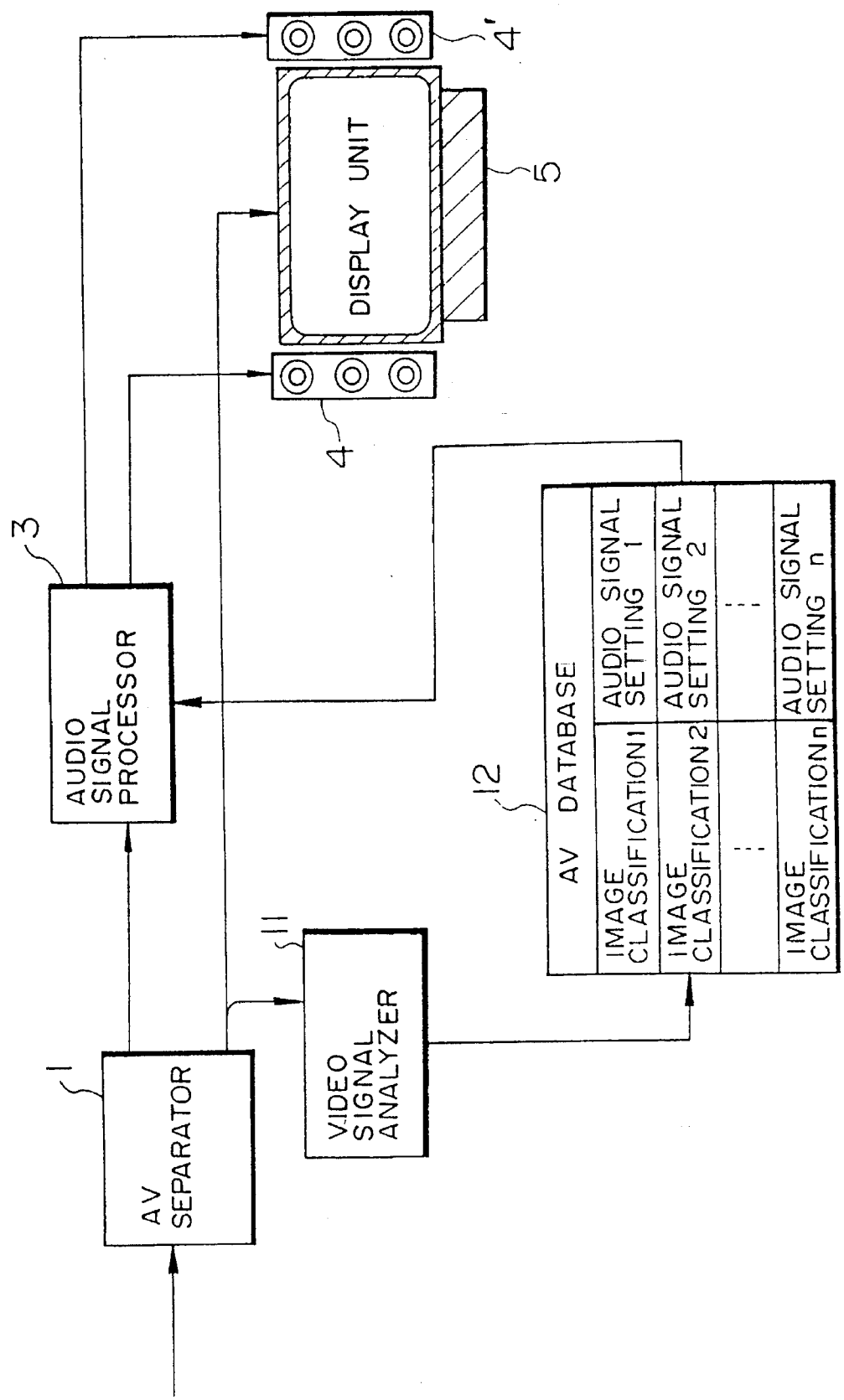
FIG. 2 is a block diagram showing a modification of the embodiment shown in FIG. 1.

FIG. 2 is a block diagram showing a modification of the embodiment shown in FIG. 1. A different point of the modification shown in FIG. 2 from the embodiment shown in FIG. 1 is a database 12 (hereinafter called an AV database) which stores combinations of the video signal characteristics and corresponding audio signal processing parameters. The AV database 12 stores audio signal processing parameters and is accessed to read parameters matching the characteristics of a video signal analyzed by the video signal analyzer. The reason why a database is used for the control of an audio signal is that there is a case wherein a correspondence between the video signal characteristics and the audio signal control characteristics cannot be properly calculated. For this reason, instead of programming a characteristic control sequence for the acoustic edition, a database is used in which stored are relationships between video signals and corresponding audio signal processing parameters determined by the rule of experiences of acoustic editors. For an audio signal process matching senses, it is more realistic and effective to use the rule of experiences of professional editors.

In correspondence with video signal characteristics, the AV database 12 stores, for example:

(1) a volume of sound to be reproduced;

(2) a balance between sounds reproduced by loudspeakers;

(3) the frequency characteristics of an audio signal to be reproduced (equalizing characteristics);

(4) the characteristics of a reverberation signal to be added to an audio signal by the audio signal processor (e.g., an impulse response used by a convolution calculation); and (5) the amplitudes of, balance and transmission time difference between, direct sounds (sounds directly received by a listener without reflection by a wall or the like) and reflected sounds.

Figure 20:
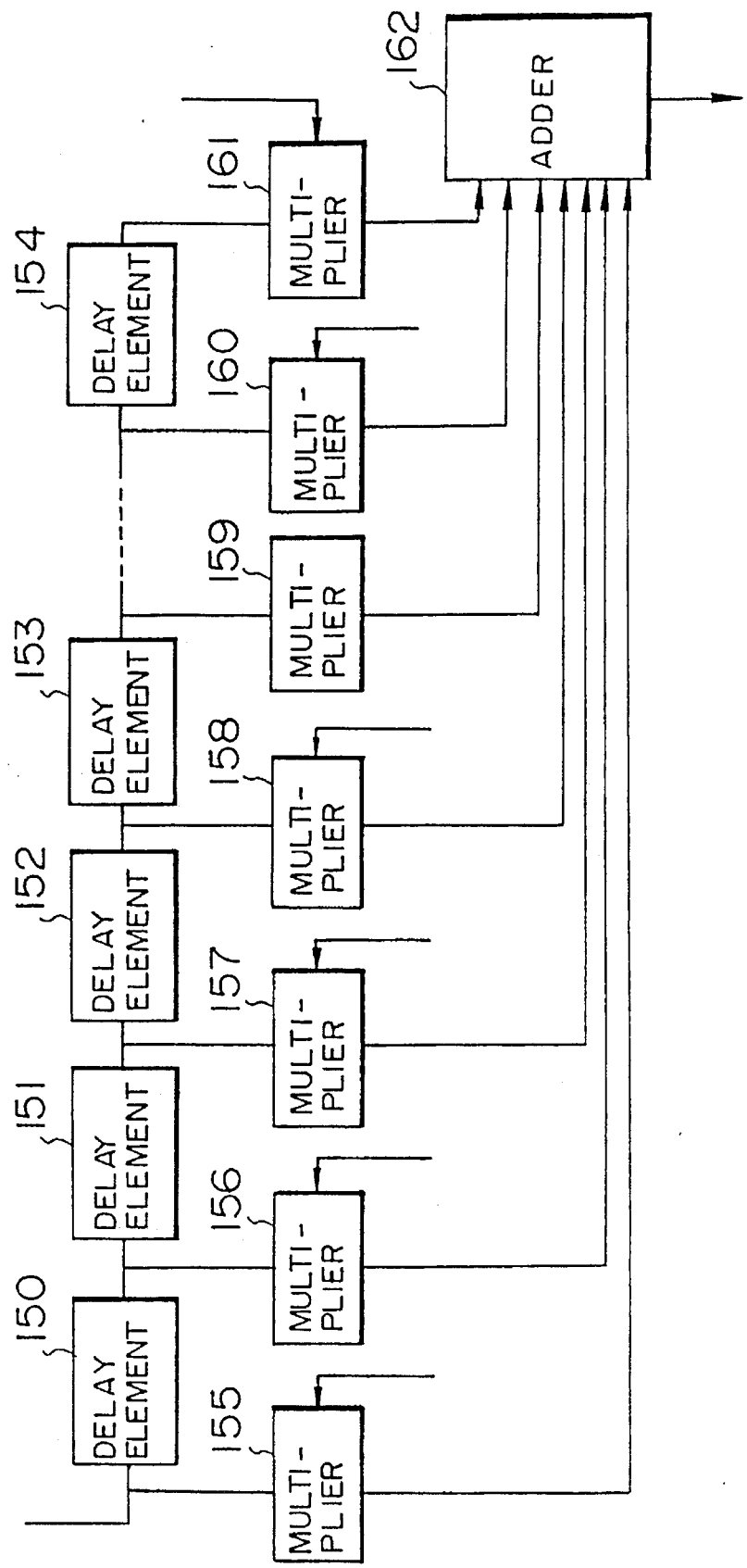
FIG. 20 is a block diagram showing the structure of an audio signal processing digital filter.

These parameters to be stored will be more detailed. The parameters (1) and (2) are associated with the volume of an audio signal and can be performed by adjusting the gain of an audio signal output amplifier. The parameters (1) and (2) are therefore gain data of audio signal output amplifiers. The parameters (3) to (5) are associated with a use of digital signal convolution calculation. For these parameters, a digital filter can be configured, for example as shown in FIG. 20, by delay elements, multipliers, and an adder. In this digital filter, a digital audio signal is inputted to the digital filter and delayed by the delay elements 150 to 154 by a integer multiple delay time of the sampling time, and thereafter each delayed output is supplied to each corresponding multiplier 155 to 161. Each multiplier 155 to 161 multiplies the input audio signal data by a preset coefficient (coefficients 1 to m) and outputs the result to the adder 162. The adder 162 adds all the outputs from the multipliers 155 to 161 and calculates a final output of the filter shown in FIG. 20. With the digital filer of the embodiment shown in FIG. 20, the equalizing and reverberation characteristics of an audio signal can be adjusted by changing the coefficients of the multipliers. For example, if a clarity of speech is to be improved by using the digital filter, the filter coefficients for the cut-off characteristics of a low frequency range are set so as to stop signals of low frequency components which are causes to lower a speech clarity. If reverberation signals are to be added, the filter coefficients for a low-pass filter are set so as to prolong an impulse response continuing time.

Figure 21:
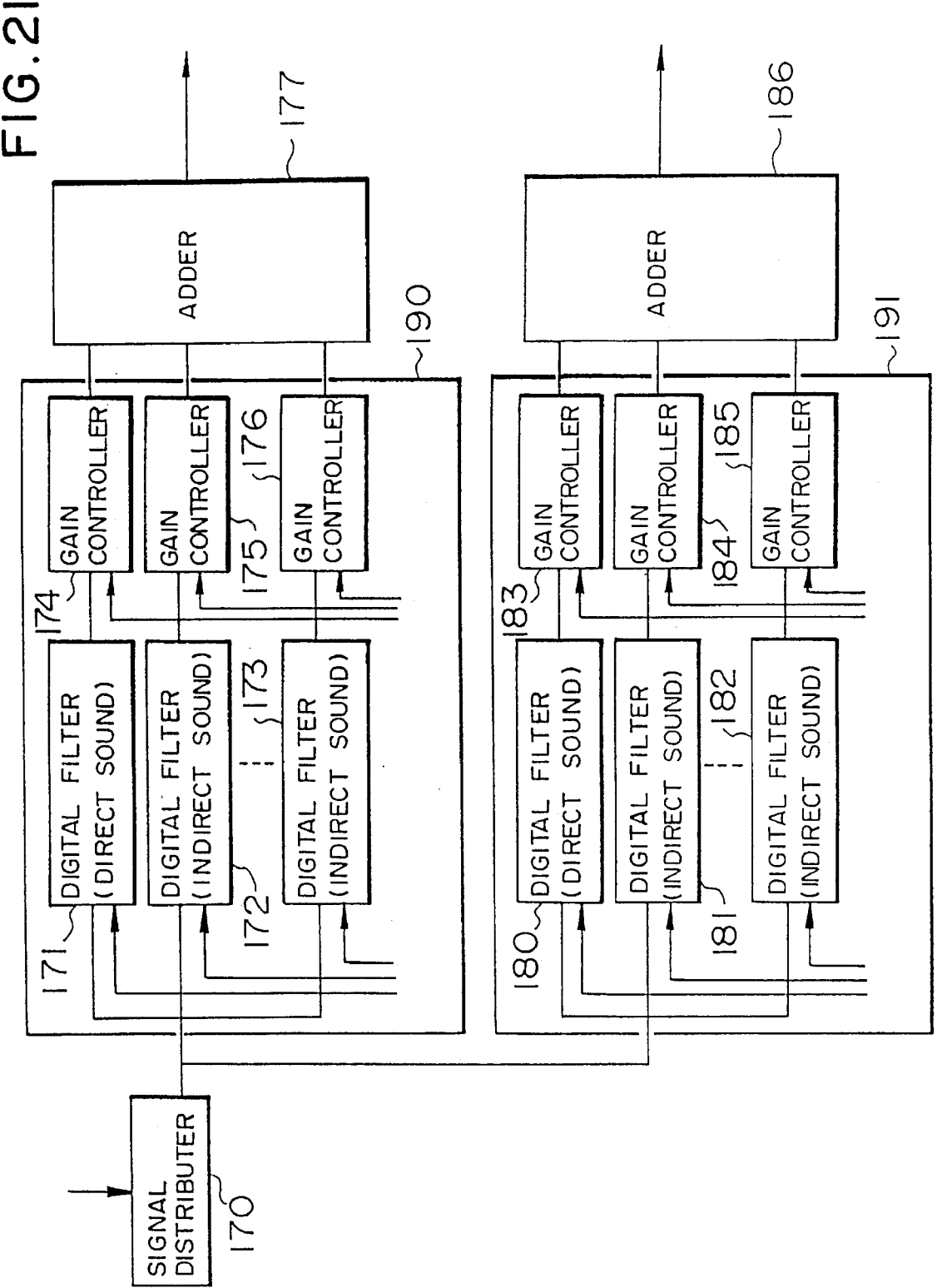
FIG. 21 is a block diagram of a loudspeaker signal processor providing a sound image orientation.

FIG. 21 shows an embodiment of a circuit for processing direct and indirect sounds and determining a sound image orientation. This circuit includes right and left signal processors 190 and 191 for performing a stereophonic process for a single series of an audio signal, and a signal distributor 170. The right and left signal processors 190 and 191 have the same structure. Therefore, the structure and operation of only the right signal processor 190 will be described by way of example. The signal processor has digital filters 171 to 173, gain controllers 174 to 176, and an adder 177. Use of a plurality of digital filters enables to generate a direct sound and indirect sounds and to adjust the frequency characteristics of an output signal and a mixing ratio of a direct sound to indirect sounds. By stereophonically reproducing right and left channel signals generated in this manner, it becomes possible to generate an audio signal excellent in sound image localization. For the control of sound image localization, digital filter coefficients and a mixing ratio (particularly, gain values) of a direct sound to indirect sounds are stored in advance in the database.

Next, an example of using stored audio signal processing data will be briefly described. Consider for example that a video signal transmitted from a partner communication site contains a human image and the image of its mouth is changing. In such a case, the video signal analyzer 11 shown in FIG. 2 judges that the person in the image is speaking. The audio signal transmitted with the video signal represents sounds spoken by the person. Therefore, in order to improve a clarity of the audio signal, coefficients of the digital filters suitable for suppressing low frequency components are read from the database and the audio signal is inputted to the digital filters. The upper limit of a high frequency range of a human voice is about 7 kHz. Therefore, the filter coefficients are also adjusted to cut frequencies of 7 kHz or higher to eliminate noises contained in the high frequency range. In this manner, by reading digital filter coefficients stored in the database suitable for suppressing low frequency components and cutting high frequency components, it becomes possible to obtain the acoustic characteristics suitable for speeches, thereby improving speech reality. If a sound image is to be orientated to a human mouth, digital filter coefficients and a mixing ratio of a direct sound to indirect sounds are adjusted and used by the circuit shown in FIG. 21.

Figure 3:
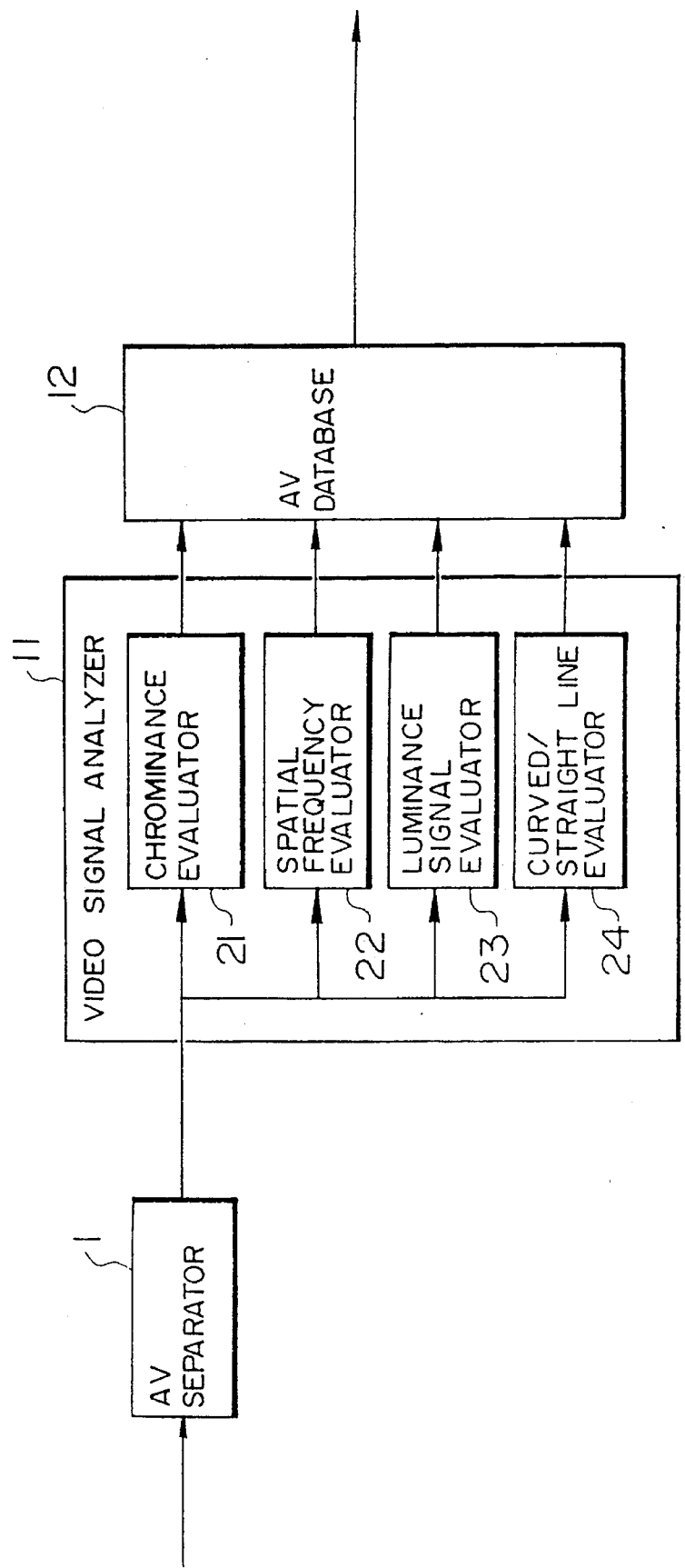
FIG. 3 is a block diagram showing the structure of a video signal analyzer.

FIG. 3 is a block diagram of an embodiment of the video signal analyzer. The fundamental structure and operation of the video signal analyzers 2 and 11 will be described with reference to FIG. 3. The video signal analyzer 2 has a chrominance signal evaluator 21 for evaluating a chrominance signal of an input audio signal, a spatial frequency evaluator 22 for evaluating a spatial frequency, a luminance signal evaluator 23 for evaluating the level and distribution of a luminance signal, and a curved/straight line analyzer 24 for analyzing a ratio of curved lines to straight lines contained in an image. Although not explicitly shown, the evaluators have also a function of detecting and evaluating the time dependent changes of evaluated results. In order to help understand easily, the AV separator 1 and the AV database 12 shown in FIG. 2 are also shown in FIG. 3.

Why the characteristics of chrominance, luminance, spatial frequency, and line segments (curved/straight lines) of a video signal are evaluated will be briefly described.

First, the reason of using a chrominance signal for the parameter control of the audio signal processor will be described. In the branch of psychology, color and its psychological effects have been studied. An impression of a displayed image and its psychological effects on a viewer is reflected by the total hue of the image. For example, an impression changes greatly between an image rich in colors and a monotone image. More specifically, it has been said that an impression of an image rich in red colors can be expressed by words such as "vivid, passionate". A single color image or monochromatic image gives an impression represented by words such as "quiet, calm". If impressions given by an image and sounds are mismatched, a viewer feels uncomfortable. A mismatch between a sound impression and an image impression can be removed and reality can be improved if an audio signal is processed by analyzing the chromatic components of a video signal.

Similar to a chrominance signal, an impression of a viewer is reflected by a luminance signal of a scene image. For example, a high contrast image having a luminance distribution from a low luminance to a high luminance gives an impression somewhat "vivid". In contrast, an image having a large distribution of low luminance often gives an impression "dark, quiet, calm". Sounds matching an impression of an image can be reproduced by evaluating a luminance distribution of a video signal, by analyzing an impression of the image by using the distribution, and by controlling the audio signal processor.

An impression of an image is also influenced by a difference of spatial frequency components. It can be easily analogized that reality can be improved by analyzing spatial frequency components and controlling the audio signal processing characteristics by the analyzed results. For example, for the spatial frequency adaptive control, if a large number of spatial frequency components of a video signal are present at the low frequency range (if an image has a low resolution), the high frequency range of an audio signal is cut by filters to lower a clarity.

It is also possible to control the audio signal processor in accordance with the contents (impression) of an image, by evaluating a ratio of curved lines to straight lines contained in an image. Specifically, line segments contained in an image can be used as a criterion for judging whether an image is an artificial object or a natural object. Generally, there is a tendency that an image having a large number of straight line segments represents an artificial object and an image mainly having curved line segments represents a natural object. Sounds more matching an image can be reproduced if the audio signal is controlled to be suitable for an artificial or natural object.

The meaning of evaluating the characteristics of a video signal has been described above. The evaluators 21 to 24 shown in FIG. 3 have a function of analyzing the characteristics described above of a video signal and outputting the analyzed results as a search key of the AV database 12. The gist of the invention is to control the processing characteristics of an audio signal in accordance with the characteristics of a video signal, and if this condition is satisfied, other characteristics of a video signal to be evaluated and other evaluation methods may also be used.

Figure 4:
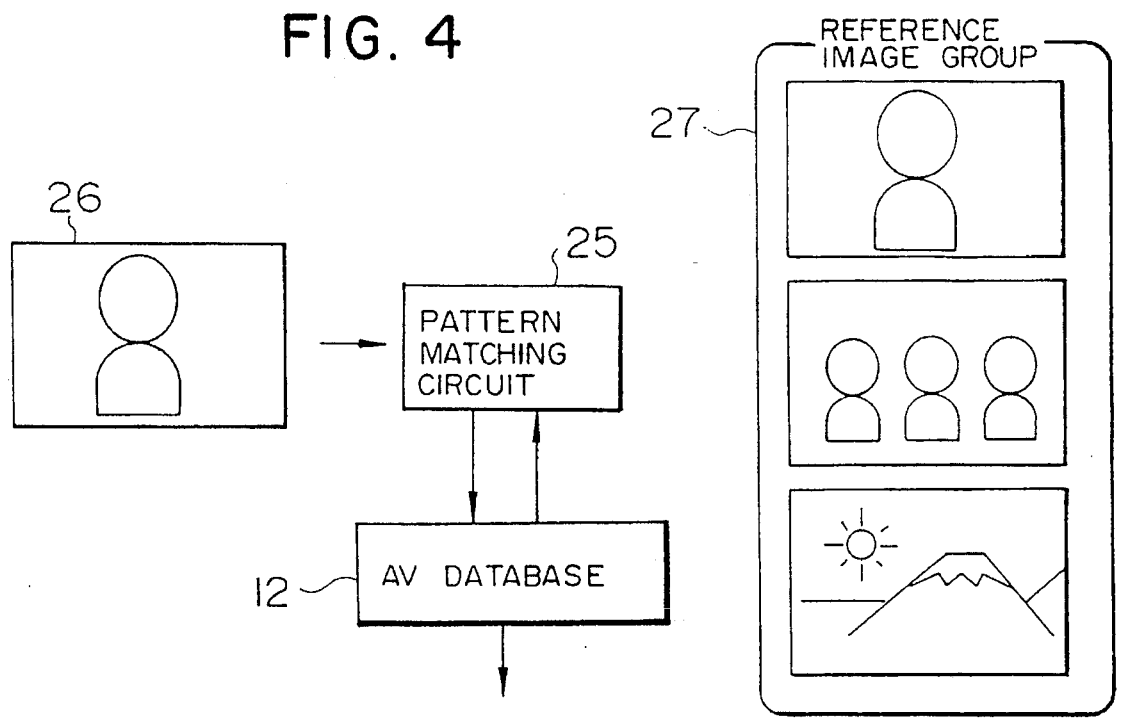
FIG. 4 is a schematic diagram explaining the operation of the video signal analyzer.

FIG. 4 illustrates another embodiment of the video signal analyzer. This embodiment is suitable for using the AV database 12 shown in FIG. 2. The characteristic feature of the embodiment resides in a use of a pattern matching method for the evaluation of a video signal. Specifically, an input video signal is compared with video signals stored in the AV database 12 to judge a similarity therebetween by a pattern matching method, and audio signal processing parameters for a video signal most similar to the input video signal are selectively used. For example, as shown in FIG. 4, it is assumed that an input image is a human image 26 and that reference images to be outputted from the AV database 12 are an image of one person, an image of a plurality of persons, and an image of a natural object 27 such as a landscape. A pattern matching circuit 25 compares patterns between an input signal 26 and a reference signal 27 to judge a most similar image. In this example, the image of one person is most similar to the input image. In accordance with this matching result, the pattern matching circuit accesses the AV database 12 and reads processing parameters for the audio signal processor. For example, if the input image is analyzed to be an image of a speaking person, the processing parameters for the audio signal processor include those parameters reducing reverberation of an audio signal so as to make a speech of one person most audible (improving a speech clarity), setting the sound volume to a level of sounds an ordinary person speaks, and orientating a sound image to the mouth of the person.

In this embodiment, a video signal is used as the input signal and reference signal for checking a match between video signals and obtaining a most similar image. Alternatively, an image recognition technique for recognizing the contents of an image may be used as a pre-process, and thereafter the audio signal processor is controlled in accordance with the recognition results. Also in this case, it can be easily understood that the same advantageous effects as described above can be obtained.

Figure 5:
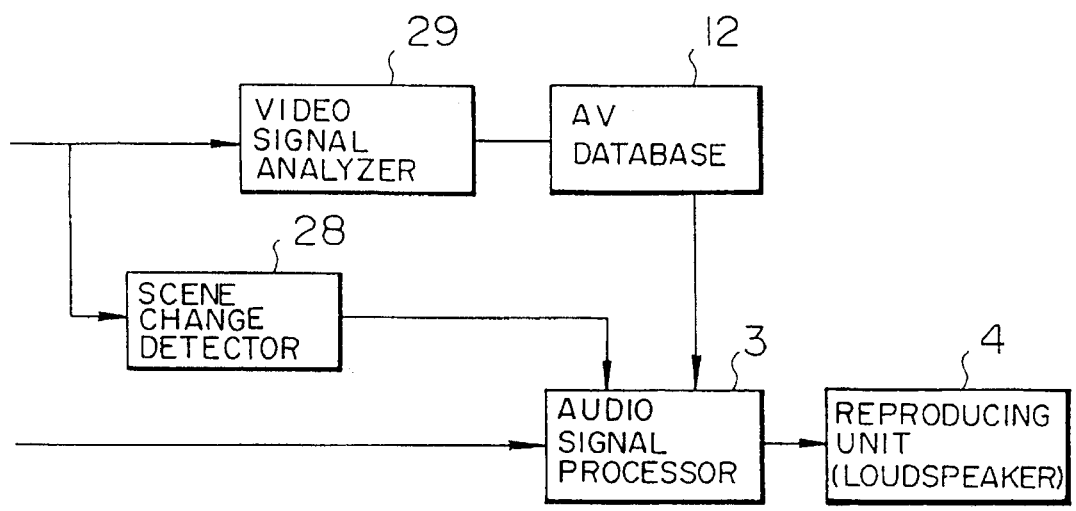
FIG. 5 is a block diagram showing the structure of an embodiment with a scene change detector according to the invention.

FIG. 5 is a block diagram showing a modification of the embodiment shown in FIG. 2. In this modification, a video signal separated from an audio signal by an AV separator 1 is inputted to a video signal analyzer 29 and to a scene change detector 28. As different from the embodiment shown in FIG. 2, this scene change detector 28 is a newly added circuit. The scene change detector 28 detects a scene change in an input video signal. The reason why a scene change in an image is detected is to derive a significant image group from consecutive image frames and to assign audio signal processing parameters to the derived image group. A video signal is generally and often constituted by consecutive image groups continuing several seconds to several tens seconds. The object of the invention can be achieved sufficiently by changing audio signal processing parameters only after a scene change. More in particular, it is empirically known that if the audio signal processing characteristics are updated each time a slight image change occurs, a viewer and listener feel uncomfortable, for example, as a sense of busyness. Updating the audio signal processing characteristics only when a scene changes aims at preventing uncomfortable feelings from being had by a viewer and listener. The audio signal processing parameters are preferably updated gently and slowly after a scene change. Ordinary persons are sensitive to a rapid change in sound quality and volume. Therefore, slowly updating audio signal processing parameters is not sensed by a viewer and listener. In this manner, the audio signal is controlled without generating uncomfortable feelings.

Figure 6:
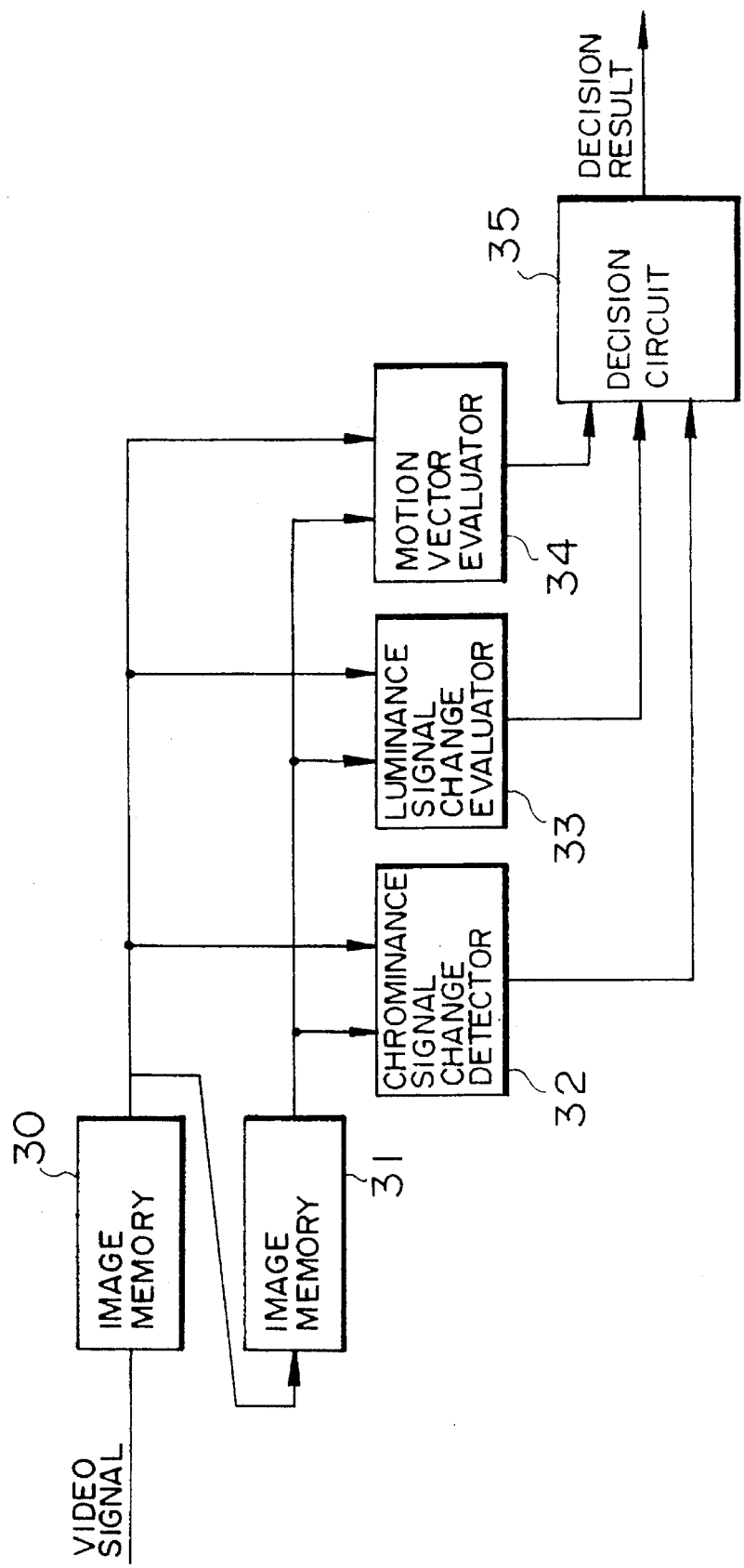
FIG. 6 is a block diagram showing the structure of the scene change detector.
Figure 7:
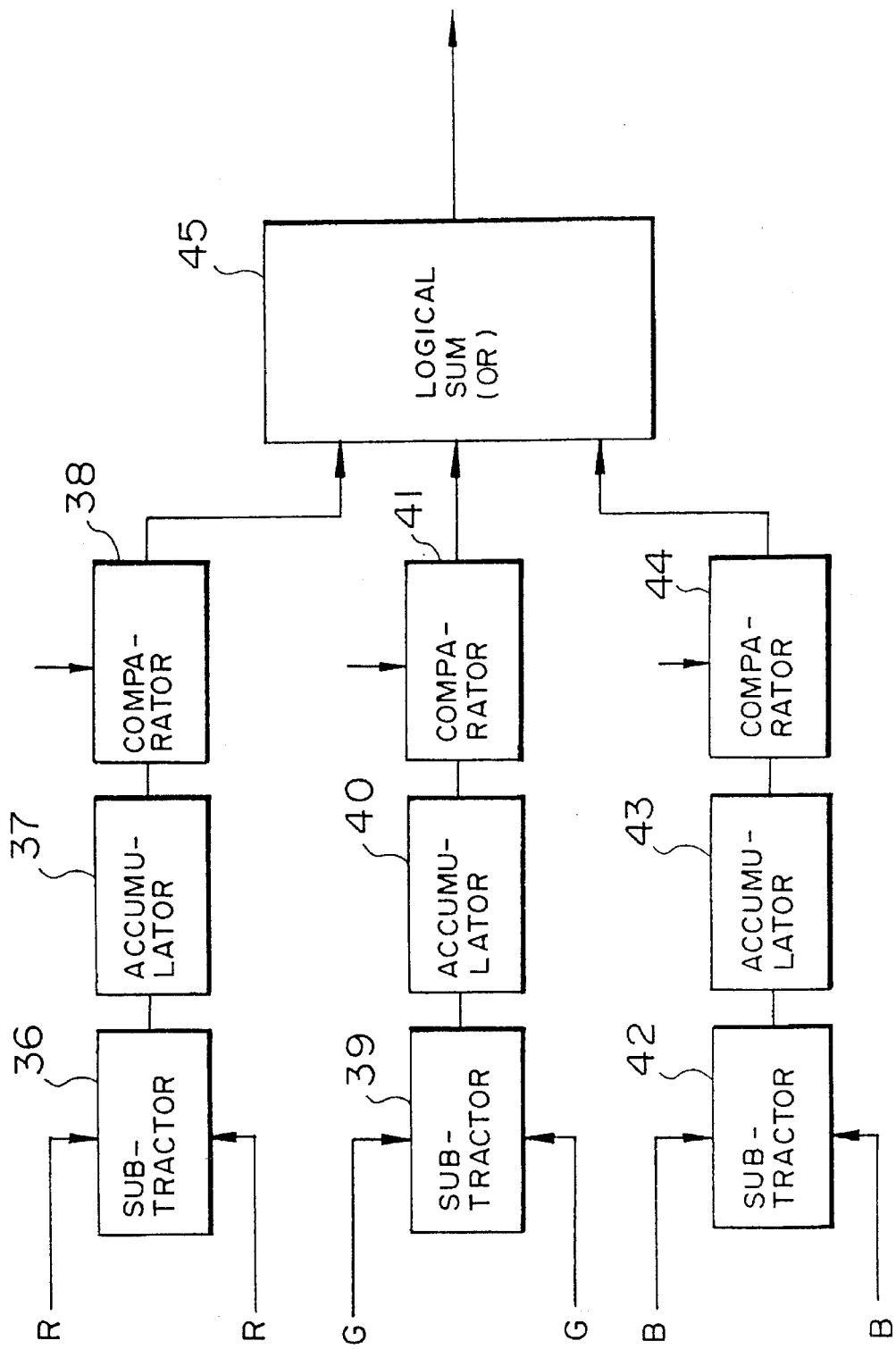
FIG. 7 is a block diagram showing the structure of a color change detector.

FIG. 6 shows an embodiment of the scene change detector 28. This detector has image memories 30 and 31, a chrominance signal change detector 32, a luminance signal change detector 33, a motion vector evaluator 34, and a decision circuit 35 for deciding the evaluation results of the evaluators. It can be easily understood that it is necessary to evaluate a change in an image with time in order to detect a scene change in a video signal. The image memories 30 and 31 are used for analyzing a change in the video signal characteristics with time. For example, the image memory 30 stores the latest video signal, and the image memory 31 stores the image signal one frame before. There are several methods of detecting a scene change in an image. In this embodiment, a change in chrominance and luminance and a motion vector between two frames are detected. As a scene in an image changes, chrominance changes. A rapid change in chrominance is detected by obtaining difference signals of each of the three primary colors (RGB) between the video signals stored in the image memories 30 and 31, by accumulating the difference signals, and by comparing the accumulated value with a threshold value. It is not always necessary to use all pixels in each frame in order to detect a rapid change in chrominance, but only pixels at typical thinned sampling points may be used with sufficient effects. An embodiment of a circuit for detecting a change in chrominance is shown in FIG. 7.

Similar to chrominance, a change in luminance can be used as one approach to detecting a scene change. It can be easily analogized that a change in a luminance signal can be detected by using the circuit structure of the embodiment shown in FIG. 7.

There are some cases wherein the level of a chrominance or luminance signal changes although the contents of an image do not change. For example, such cases occur when a camera taking an image pans (moves to the right and left) or tilts (moves up and down) or the taking lens is zoomed in or out. Although these operations take a series of images having the same contents, a scene change is detected in some cases depending on the evaluation results of chrominance and pattern matching. A sound generating position and perspective representation may be controlled in accordance with a motion of a camera or a zoom of a taking lens. However, it is not necessary to change reverberation time or sound quality. From this reason, it is preferable to detect a motion of a camera and a zoom of a taking lens separately from a scene change. To this end, the motion vector evaluator 34 is used in the embodiment shown in FIG. 6. For the evaluation of a motion vector, a subject image is divided to form a lattice, and a motion between images in the image memories 30 and 31 near at the cross points of the lattice is detected. A motion vector (direction and magnitude of a motion) is evaluated at each detecting point to discriminate between a motion of a camera, a zoom of a taking lens, and a motion of a subject itself. For example, if a camera is panned or tilted, motion vectors having the same direction (right and left directions for panning, and up and down directions for tilting) are detected at all detecting points. Motion vectors having the radial directions from the optical axis are observed in the case of the zooming operation. If such motion vectors are observed, it is judged that the motion is the panning, tilting, or zooming operation and not a scene change in an image. The decision circuit 35 totally decides whether a scene change in an image has occurred in accordance with the result of the chrominance signal change detector 32, the result of the luminance signal change evaluator 33, and the result of the motion vector evaluator 34. Only when a true scene change in an image is detected, the decision circuit 35 generates a control signal indicating an occurrence of a scene change. For a motion of a camera or a zoom of a taking lens, only a motion of a sound image or a perspective representation is controlled. By updating audio signal processing parameters in the manner described above, audio signals suitable for each series of significant images can be formed.

Figure 8:
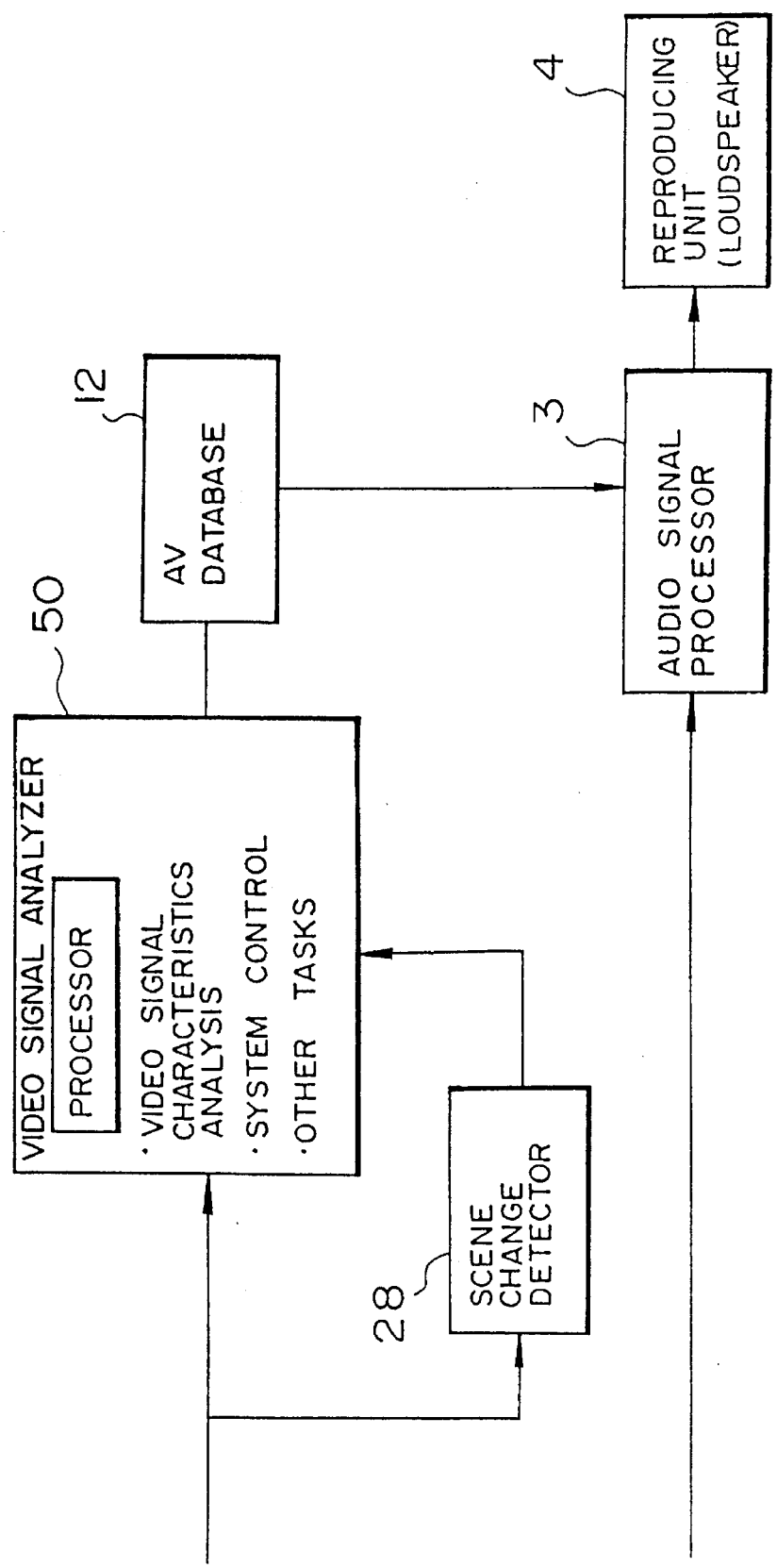
FIG. 8 is a block diagram showing the structure of another video signal analyzer.

FIG. 8 shows a modification of the embodiment shown in FIG. 6. In the embodiment shown in FIG. 6, the characteristics of a video signal are always analyzed and when a scene change is detected, audio signal processing parameters are updated. In contrast, in the embodiment shown in FIG. 8, only when a scene change is detected, a video signal analyzer 50 starts operating. Specifically, the video signal analyzer 50 is connected so as to be responsive also to a control signal from a scene change detector 28. This arrangement that a video signal is analyzed only when it changes, becomes effective when the characteristics of a video signal are analyzed by using a general processor. For example, in a system which analyzes video signal characteristics and performs other controls by using the same processor, the operation load of the processor can be reduced by stopping the analysis of video signal characteristics while the same scene continues. The remaining calculation capacity of the processor produced by a reduction of an image signal analysis load can be used for other signal processings and system controls, resulting in an improved performance of the whole system.

Figure 9:
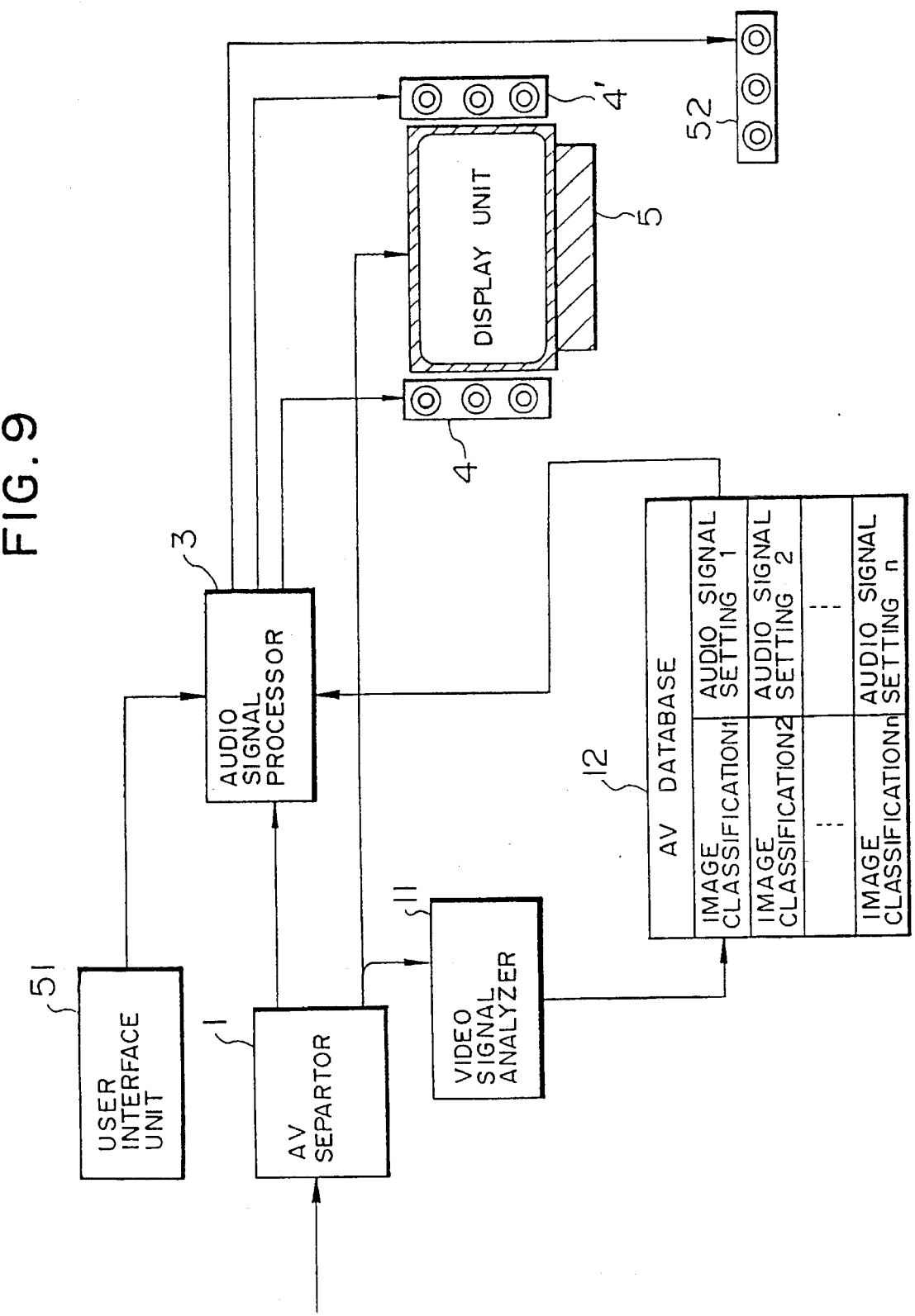
FIG. 9 is a block diagram showing the structure of an embodiment with a user interface unit.

FIG. 9 shows a modification of the embodiments shown in FIGS. 1 and 2. The modification shown in FIG. 9 has a user interface unit 51 added to the embodiment shown in FIG. 2. As the user interface unit 51, a keyboard, a mouse, a pen tablet, and the like may be used. This modification differs from the embodiment shown in FIG. 2 in that supplemental control signals from the user interface unit 51 are also used for the control of the characteristics of the audio signal processor 3. The supplemental control signals include a request signal for setting user audio signal processing parameters, a control signal for describing image attributes, and other control signals.

Figure 10:
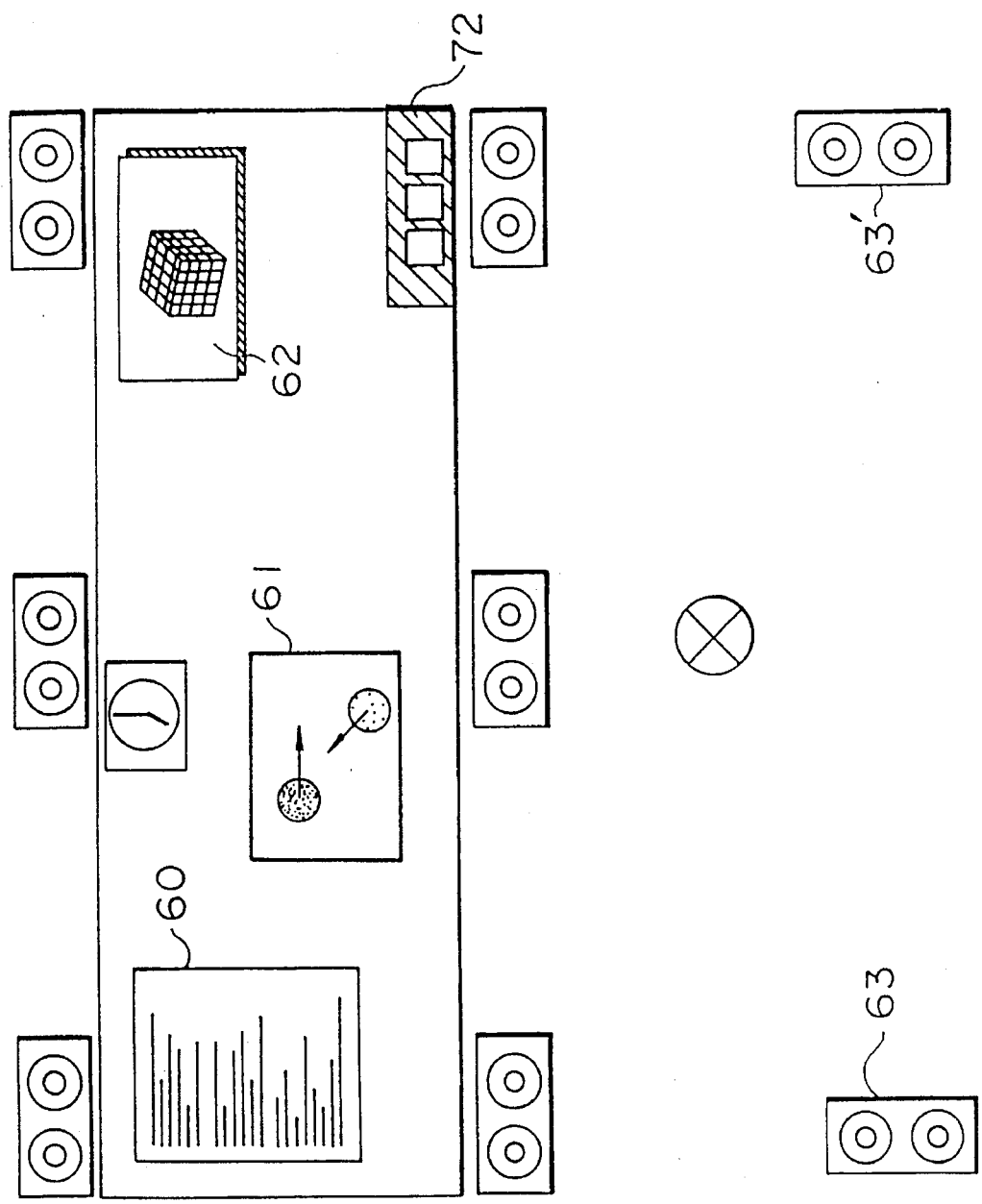
FIG. 10 is a schematic diagram showing the outline of the system structure according to an embodiment of the invention.

Examples of using supplemental control information will be described with reference to FIG. 10 which shows an example of a display screen of the embodiment apparatus shown in FIG. 9. In this example, an image 61 transmitted from a communication partner and other images 60 and 62 are displayed at the same time. Icons are displayed in an icon area 72 of FIG. 10, the icons representing images not directly used by participants and the user at its own site. If an image represented by an icon has a corresponding audio signal, the audio signal may be presented to the user as audible sounds to the extent that they do not disturb the work of the user. In order not to disturb the work, sounds corresponding to an image represented by an icon are not orientated in the screen, but they are reproduced, for example, from rear or side wall loudspeakers 63 and 63'. In this case, the supplementary control information is "sounds under reproduction have a corresponding icon", the information being supplied when a user clicks the window. The audio signal processor controls so as to reproduce sounds corresponding to an image represented by an icon from back/side wall loudspeakers. As supplementary control information, information "an audio signal of an image represented by an icon is not reproduced" may be used. In this case, as will be later described, an audio signal transmitted from a communication partner is transformed into some graphics symbol to display it.

Figure 11:
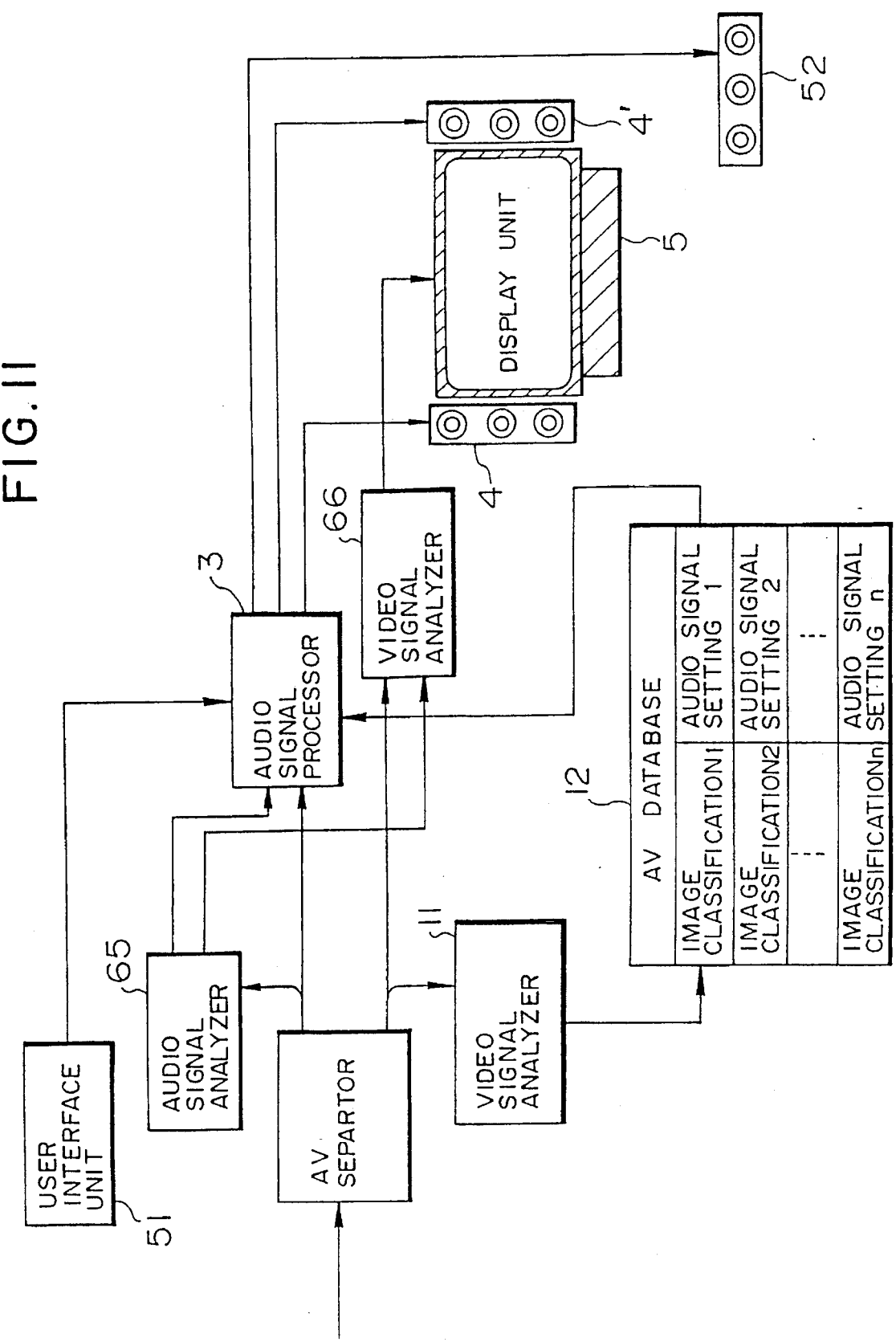
FIG. 11 is a block diagram showing the structure of an embodiment with an audio signal analyzer.

FIG. 11 shows a modification of the embodiment shown in FIG. 9. This modification differs from the embodiment shown in FIG. 9 in that an audio signal analyzer 65 is provided. The audio signal analyzer 65 analyzes the characteristics of an audio signal separated by the AV separator 1, and in accordance with the analyzed results, it controls a video signal processing method. The control of the video signal processing method by an audio signal is a novel feature of this embodiment. The other operations such as changing audio signal processing parameters in accordance with a video signal, are the same as the embodiment shown in FIG. 9, and so the description thereof is omitted.

The operation of the apparatus shown in FIG. 11 will be described with reference to FIG. 12 which shows an example of a display on the screen of the apparatus shown in FIG. 11. In this example, a transmitted image as well as a text image 70 and a computer graphics image 71 is displayed at the same time to form a multi-window display. Of a plurality of windows displayed on the screen shown in FIG. 12, unnecessary images are often displayed as icons. In the embodiment shown in FIG. 9, sounds of images represented by icons are reproduced from side or back wall loudspeakers. In this embodiment shown in FIG. 12, sounds are not reproduced but they are transformed in a graphics symbol to display the symbol. In this embodiment, the size of an icon representing an image with an audio signal is changed in accordance with the amplitude of the audio signal. For example, the size of an icon for a large level audio signal is made large, whereas the size of an icon for a small level audio signal is made small. The volume of a sound is important information of an image with sounds. User-friendly interface can be provided by indicating the volume of an audio signal as the size of an icon which a user can grasp intuitively.

FIG. 13 is a block diagram showing an example of the circuit of an apparatus realizing a display such as shown in FIG. 12. This embodiment circuit has audio signal level detectors 78 to 81, an icon generator 83 including an icon size controller 84, and a video signal processor 82. An AV signal is separated into an audio signal and a video signal by AV separators 74 to 77. Separated audio signals are supplied to the audio signal level detectors 78 to 81 which detect the levels of the inputted audio signals to control the icon size controllers 84 of the icon generator 83. For example, it controls so that the size of an icon for a large level audio signal is made large, whereas the size of an icon for a small level audio signal is made small. The operation of the apparatus shown in FIG. 13 described above allows to provide the display such as shown in FIG. 12. It is more preferable to measure an average volume during a predetermined time duration than to measure an instantaneous level of an audio signal. If the size of an icon is changed frequently with an instantaneous sound level, a user feels uncomfortable, which can be avoided by the size control using an average volume during a long time duration.

FIG. 14 shows an example of a display on the screen of an apparatus of another embodiment wherein an audio signal is analyzed to process a video signal. In this example, the tone of an audio signal is analyzed, and in accordance with the analyzed results, the color of a displayed video signal is controlled. For example, if an audio signal is analyzed that it is in major tone, the video signal is displayed reddish, if an audio signal is analyzed that it is in minor tone, the video signal is displayed bluish, and if an audio signal is analyzed that it is neither in major nor minor, the video signal is displayed in neutral grey color. Although the tone of an audio signal may be represented by a numeral or character, representation of the tone by a color is more sensitive and intuitive for a user. As a term "tone color" implies, the tone of an audio signal is supposed to have an intimate relation to color. It is preferable to represent the tone of an audio signal by color. The relationship between tones and colors change depending on each person, each race, living conditions, experiences, and so on. Therefore, the correspondence between tones and colors may be set in accordance with a user preference.

FIG. 15 is a block diagram of the circuit of an apparatus for displaying an audio signal in color corresponding to its tone. Similar to FIG. 13, audio signals separated from AV signals 74 to 77 are supplied to audio signal analyzers 90 to 93 which judge the tones by analyzing cord structures and melody line or sequence. The judgement results are supplied to an icon display color controller 95 of an icon generator 94. The icon display controller 95 controls the color of an icon representing an image in accordance with the judgement results by the audio signal analyzers. As described previously, for example, the tone of an audio signal is represented by reddish color if a major tone audio signal, bluish color if a minor tone audio signal, and neutral grey color if neither major nor minor. A video signal processor 82 controls to display such colored icons on the display unit in predetermined areas.

Figure 16A:
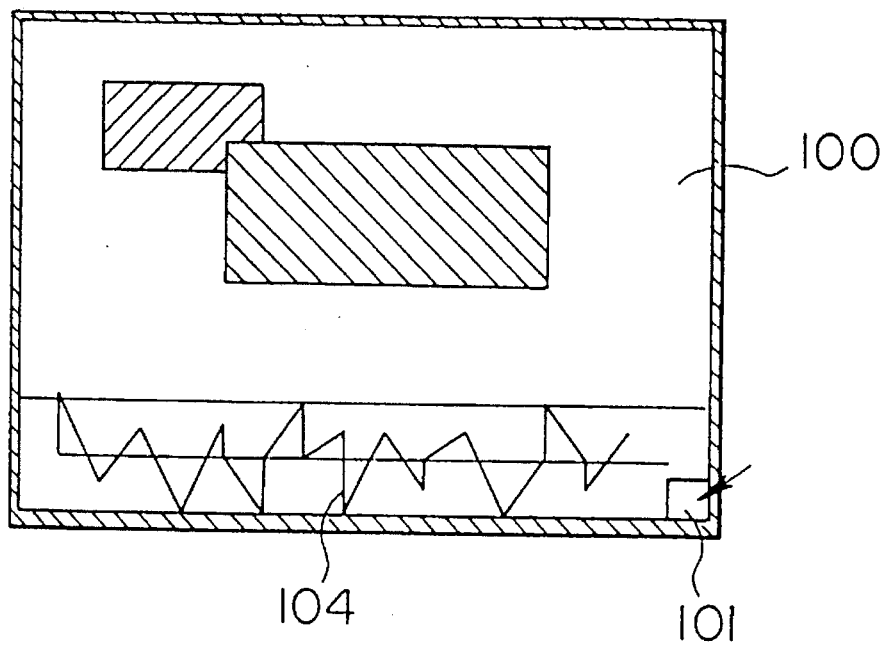
FIGS. 16A and 16B show examples of icons displayed on a screen.
Figure 16B:
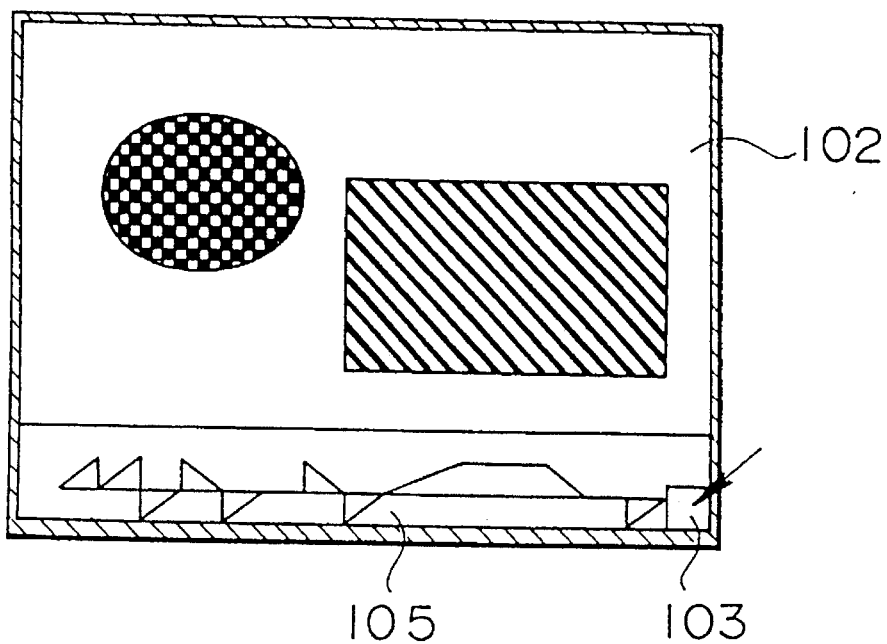

FIGS. 16A and 16B illustrate another method of representing the tone of an audio signal as a graphics image instead of a colored icon. Instead of an icon, a graphics image for an audio signal is displayed on the screen. The audio signal corresponding to the graphics image is not reproduced because it may disturb a user work or thought, but a color image for the audio signal is displayed on the screen at an audio signal characteristics display area 101 (FIG. 16A), 103 (FIG. 16B). A level change of the audio signal may be displayed time sequentially by using a polygonal line graph 104 (FIG. 16A), 105 (FIG. 16B) or the like, providing easy-to-understand user interface.

Figure 17:
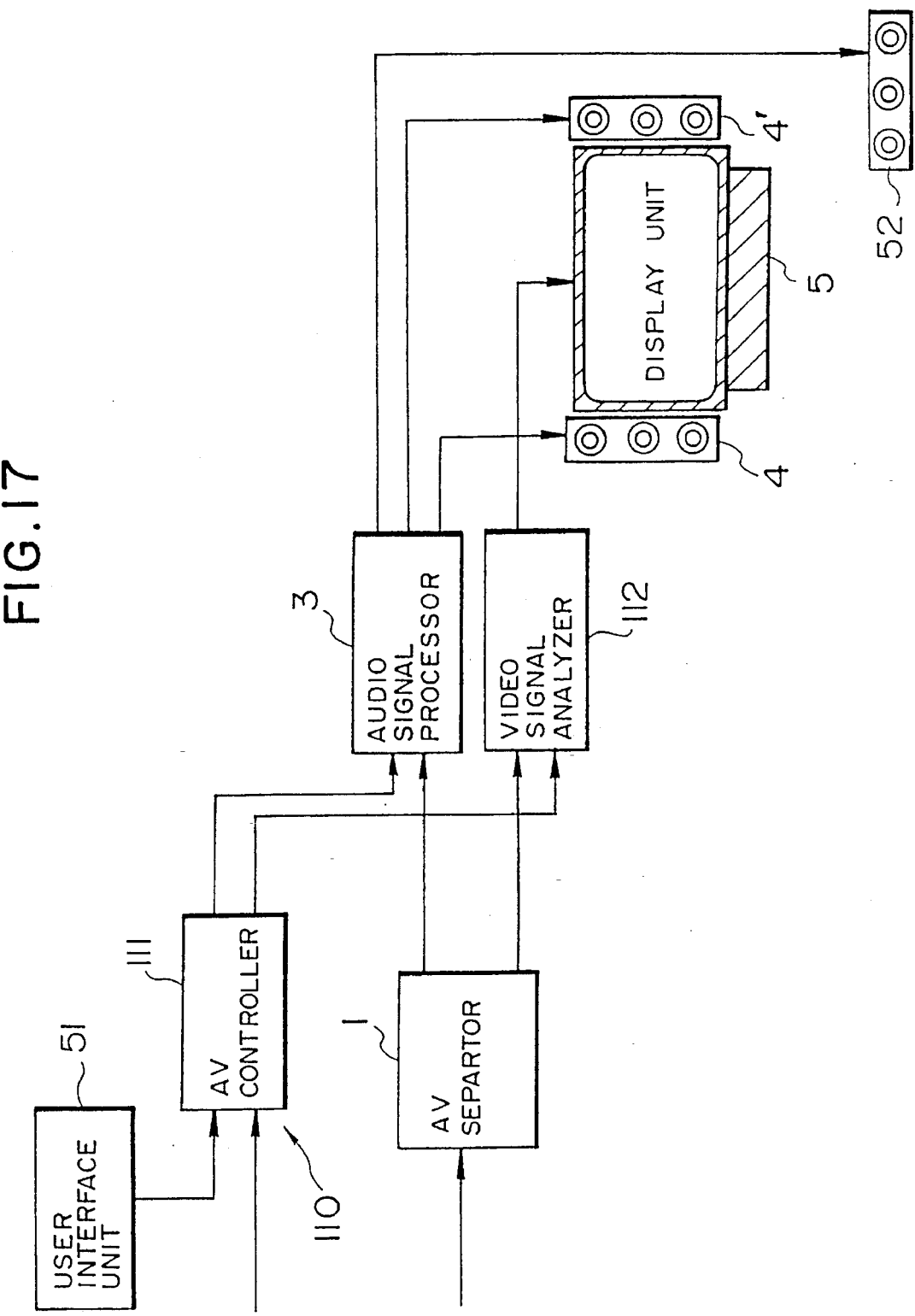
FIG. 17 is a block diagram showing the structure of an embodiment of the invention.

FIG. 17 shows another embodiment of the apparatus for integrally controlling audio and video signals. A novel point of this embodiment is a provision of an AV controller 111 which is supplied with a signal from a user interface unit 51 and an event signal from a system controller (not shown). The AV controller 111 analyzes the inputted signals to generate control signals and supply them to the audio signal processor 3 and the video signal processor 112 for processing an audio signal and a video signal separated by and supplied from the AV separator 1. As will be later described, the signal processors 3 and 112 have a function of generating an effect sound and image for drawing user attention.

Figure 18:
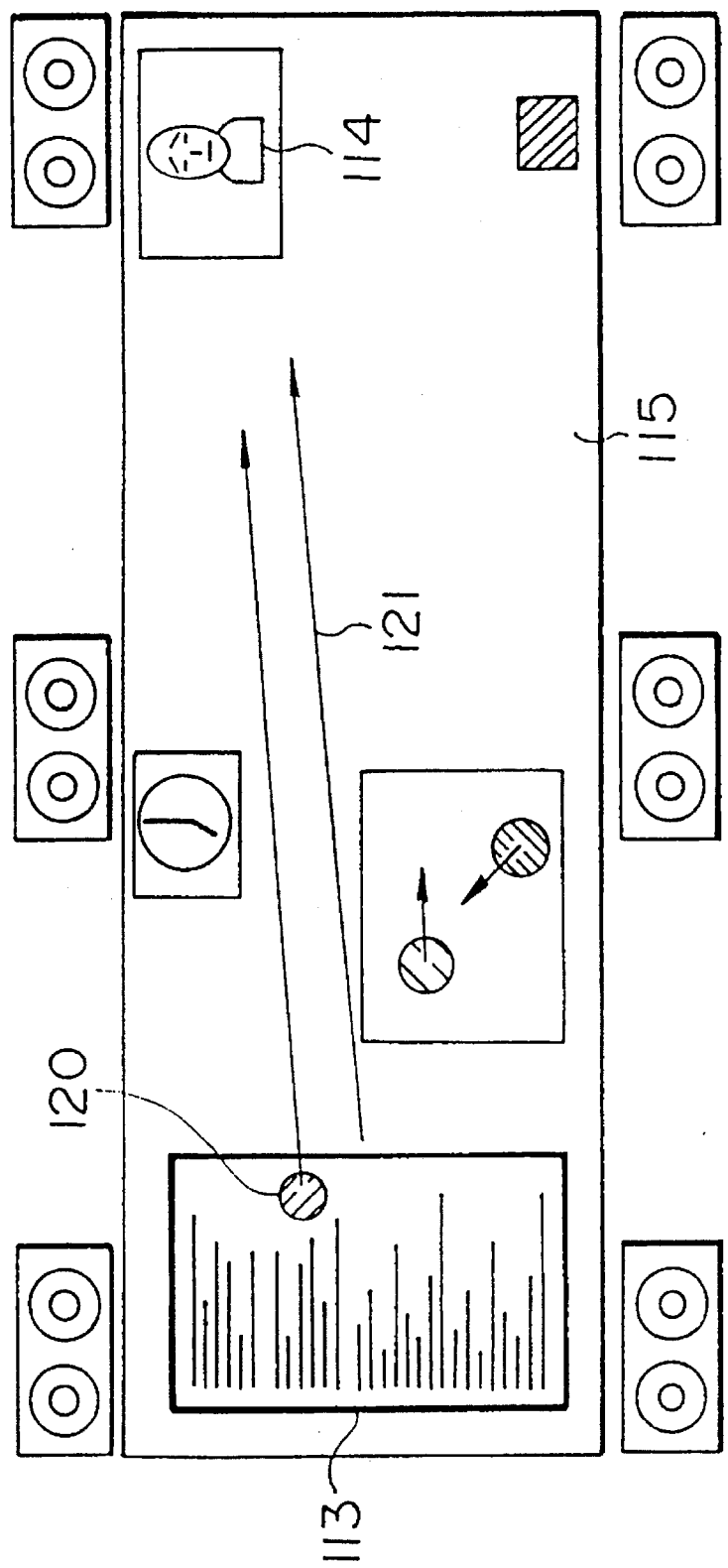
FIG. 18 shows a display screen explaining the operation of the embodiment shown in FIG. 17.

FIG. 18 shows an example of a display on the screen of the embodiment apparatus shown in FIG. 17, explaining the operation of the embodiment. In a TV conferencing system or visual telemetry system using a large display screen or a plurality of display screens, a user viewing some image (in this example, a text area 113) may well not notice a change (in this example, an image 114 displayed upon a speech request on a TV telephone). The embodiment shown in FIG. 18 provides a method of quickly and reliably informing a user of an event or change at the area other than the attended screen area. To this end, the AV controller 111 uses a signal from the user interface unit 51 and the event signal 110. The AV controller 111 judges a user attended image area from an input condition (key input, mouse manipulation, pen tablet touch position) of the user interface unit 51, and controls the video signal processor 112 to display a user guide line or marker extending from the user attended image area. For example, in the case of the user attended area in the text area as shown in FIG. 18, an image marker 120 is first displayed at the area near the user attended area, and thereafter the image marker 120 is moved toward a window (in this example, the image area 114) at which an event occurred. At the same time, the AV controller 111 controls the audio signal processor 3 to generate and orientate a user notice sound 121 in association with the motion of the image marker 120. Similar to the image marker, the sound image of the notice sound 121 is moved near to the image area 114 where an event or change occurred. The characteristic feature of this embodiment is to draw attention of a user by sounds by moving the sound image localization from the user attended area to the event occurrence area. Not by merely localizing a sound image at the event occurrence area but by moving it from the user attended area to the event occurrence area, it is possible to reduce an erroneous notice of a sound image and allow an identification of a correct screen area. If the image marker only is used to draw attention of a user, the user is required to look at the marker. However, in combination with the sound image marker, the event occurrence area can be known even if the image marker is failed to be attended.

Figure 19:
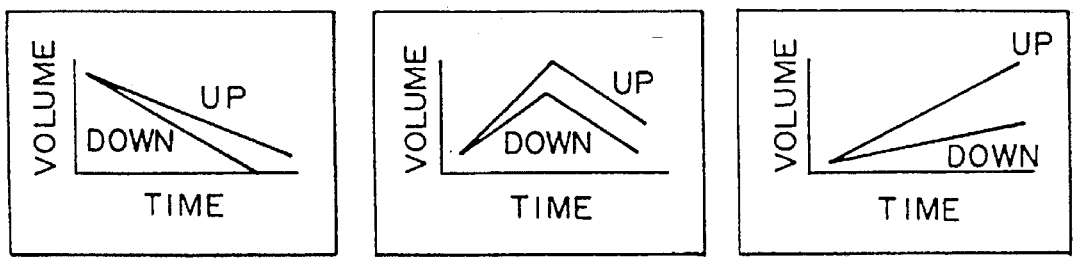
FIG. 19 are graphs showing the sound volume control characteristics relative to sound image motions.

FIG. 19 are graphs showing examples of sound volume characteristics of a sound image moving from a user attended area to an event occurrence area. In the embodiment shown in FIG. 18, three right, left, and center loudspeakers are disposed in the horizontal direction in each of the upper and lower rows. By controlling the balance of sound volumes between these loudspeakers, a motion of a sound image is realized. The abscissa of the control characteristics shown in FIG. 19 represents a time lapse, and the ordinate represents a sound volume. As described above, the image marker 120 and sound image marker 121 are moved in unison from a user attended area to an event occurrence area, thereby providing easy-to-use interface.

Next, a multi-site communication system to which the invention is applied will be described by using a TV conferencing system by way of example.

Figure 22:
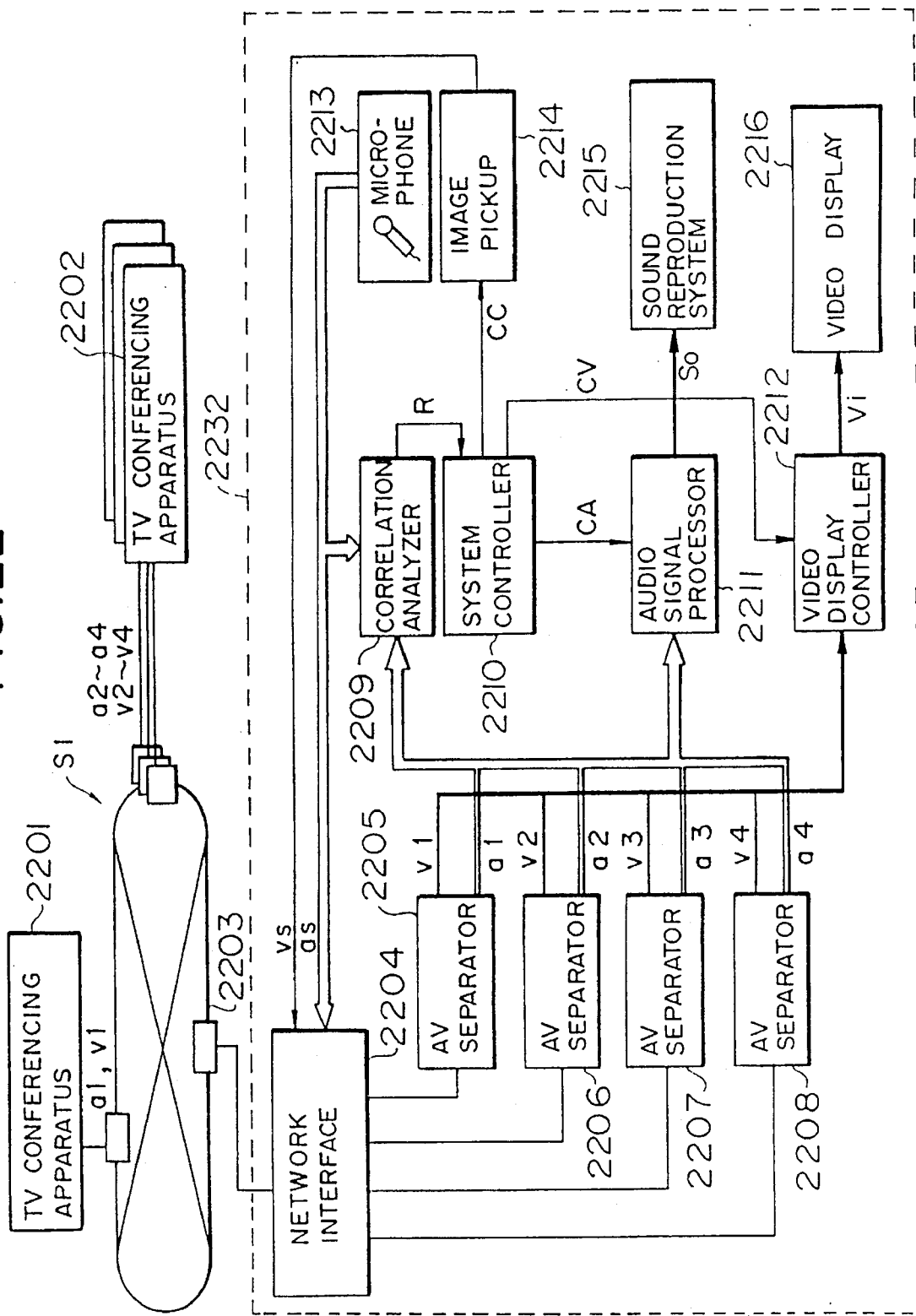
FIG. 22 is a block diagram showing the structure of an embodiment of the invention.

FIG. 22 is a block diagram showing the outline of a TV conferencing system according to an embodiment of the invention.

In this TV conferencing system S1, individual-type TV conferencing apparatuses 2201, 2202, ..., 2232 are installed at a plurality of sites on a communication network 2203, and audio signals a and video signals v are transferred between these TV conferencing apparatuses 2201 to 2232.

These apparatuses 2201 to 2232 have the same structure, and only the structure of the TV conferencing apparatus 2232 is shown in FIG. 22.

The TV conferencing apparatus 2232 has a network interface unit 2204, AV separators 2225, 2206, 2207, and 2208, a correlation analyzer 2209, a system controller 2210, an audio signal processor 2211, a video display controller 2212, a microphone 2213, an image pickup unit 2214, a sound (sound field) reproduction unit 2215, and a video display unit 2216.

The network interface unit 2204 generates an AV signal from an audio signal as picked up by the microphone 2213 and a video signal vs recorded by the image pickup unit 14, and transmits the AV signal to the communication network 2203. AV signals transmitted from the other TV conferencing apparatuses 2201, 2202, ..., 2231 to the TV conferencing apparatus 2232 are received via the communication network 2203 and separated for each of the TV conferencing apparatuses 2201, 2202, ..., 2231 and outputted to corresponding ones of the AV separators 2205, 2206, ..., 2208.

The AV separator 2205 separates the AV signal transmitted from the TV conferencing apparatus 2201 into an audio signal a1 and a video signal v1, the audio signal a1 being supplied to the correlation analyzer 2209 and to the audio signal processor 2211 and the video signal v1 being supplied to the video display controller 2212.

The other AV separators 2206 to 2208 perform similar operations.

The correlation analyzer 2209 analyzes correlations between the audio signal as generated at its TV conferencing apparatus 2232 and audio signals a1 to a4 received from the other TV conferencing apparatuses 2201, 2202, ..., 2231, identifies the other TV conferencing site having the largest correlation as a speech partner, and outputs a speech partner identifying signal R to the system controller 2210.

In response to the speech partner identifying signal R, the system controller 2210 outputs an audio signal control signal CA to the audio signal processor 2211, a video display control signal CV to the video display controller 2212, and an image pickup control signal CC to the image pickup unit 2214.

The audio signal processor 2211 processes the audio signals a1 to a4 and outputs an audio signal reproduction signal So to the sound reproduction system 2215.

The video display controller 2212 synthesizes video signals v1 to v4, and outputs a display signal Vi to the video display unit 2216.

Figure 23:
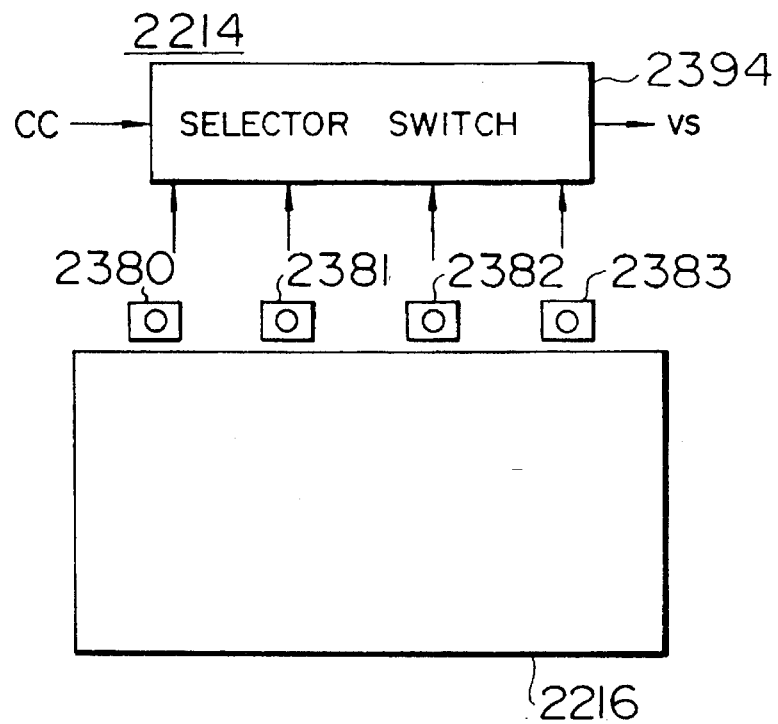
FIG. 23 is a schematic diagram showing the structure of an image pickup unit.

FIG. 23 is a schematic diagram showing the image pickup unit 2214. The image pickup unit 2214 has TV cameras 2380 to 2383 disposed on the video display unit 2216, and a selector switch 2394 for selecting one of the TV cameras 2380 to 2383 and outputting the video signal.

Figure 24:
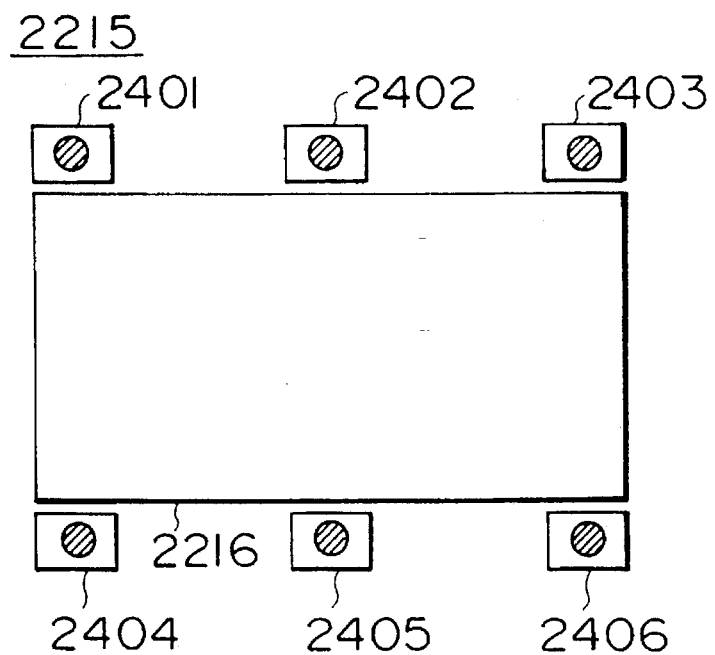
FIG. 24 is a schematic diagram showing the layout of loudspeakers.

FIG. 24 is a schematic diagram showing the sound reproduction system 2215. In accordance with the sound reproduction signal So, the sound reproduction system 2215 reproduces sounds from loudspeakers 2401 to 2406 disposed on the video display unit at the top and bottom thereof.

Figure 25:
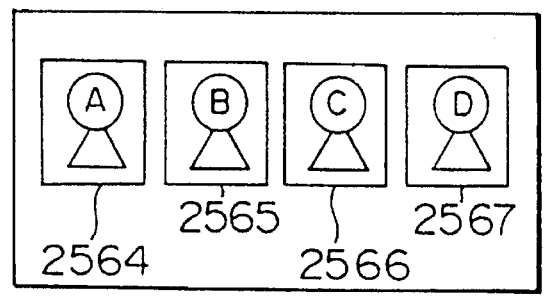
FIG. 25 is a schematic diagrams showing the layout of windows on a screen.

FIG. 25 is a schematic diagram showing the video display unit 2216. In accordance with the display signal Vi, the video display unit 2216 displays the images of participants A to D at the other TV conferencing sites.

Figure 26:
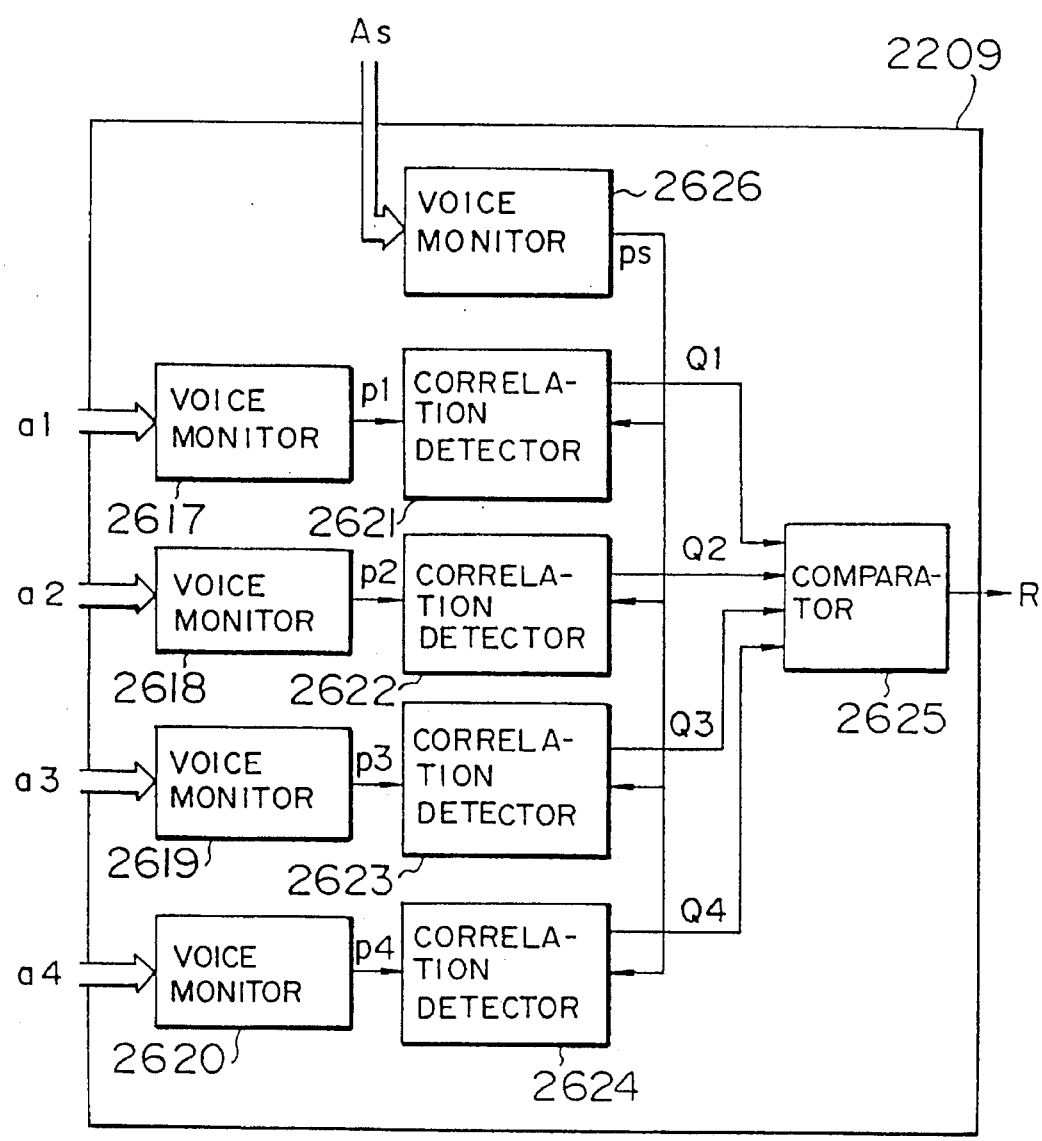
FIG. 26 is a block diagram showing the structure of a correlation analyzer.

FIG. 26 is a block diagram showing the internal structure of the correlation analyzer 2209.

The correlation analyzer 2209 has voice detectors 2617 to 2620, and 2626, correlation detectors 2621 to 2624, and a comparator 2625. The voice detectors 2617 to 1620, and 2626 generate average power signals p1 to p4, and ps of the audio signals a1 to a4 transmitted from the other TV conferencing apparatuses 2201, 2202, ..., 2231 and the audio signal as of its own TV conferencing apparatus 2232. The correlation detectors 2621 to 2624 calculate correlations between the average power signal ps and the average power signals p1 to p4, respectively. The comparator 2625 selects another TV conferencing site having the largest correlation from the other TV conferencing sites, and outputs the speech partner identifying signal R.

Figure 27:
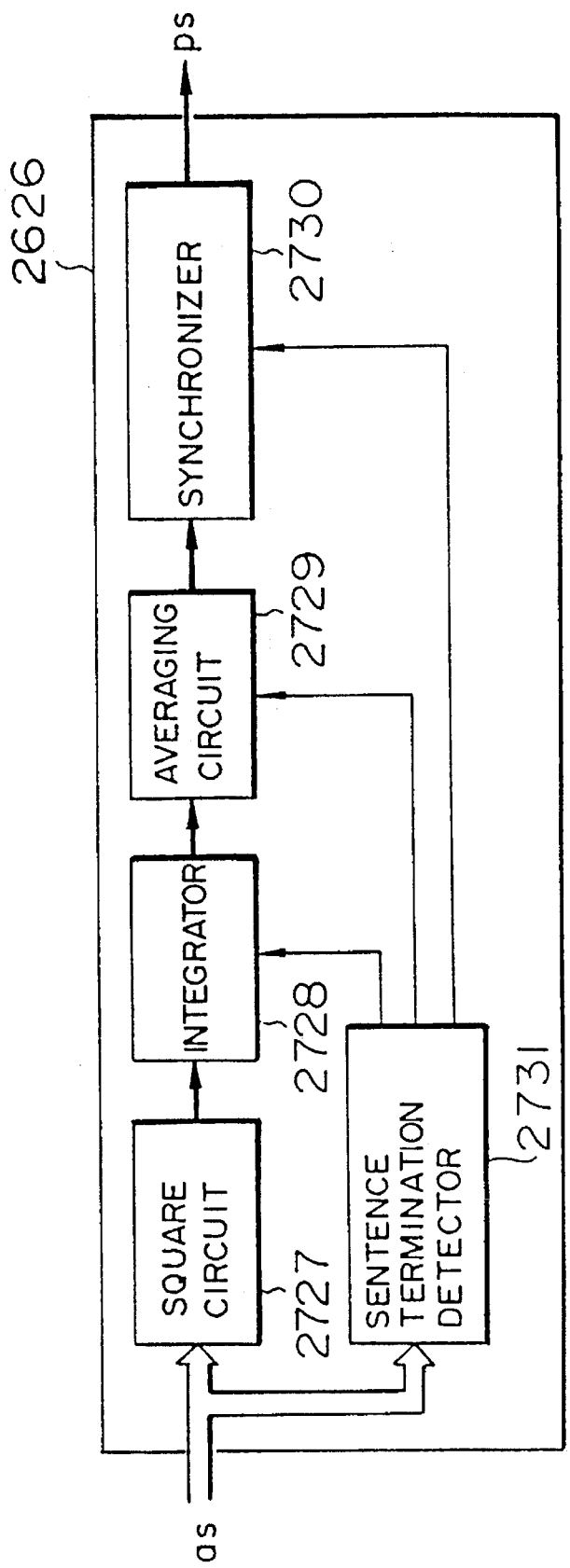
FIG. 27 is a block diagram showing the structure of a speech monitor.

FIG. 27 is a block diagram of the voice detector 2626. The structures of the voice detectors 2617 to 2620 are the same as the voice detector 2626.

The voice detector 2626 has a square circuit 2727 for squaring the audio signal as, an integrator 2728 for integrating the squared signal, and an averaging circuit 2729 for dividing the integrated value by a speech time duration and obtaining an average power of the audio signal, a synchronizer 2730, and a sentence termination detector 2731. The synchronizer 2730 outputs the average power signal ps of the audio signal synchronously with the start of a new sentence. The sentence termination detector 2731 detects a sentence termination by monitoring, for example, Japanese sentence terminating phrases "desu", "dearu", and the like. The sentence termination detector 2731 resets the integrator 2728 if the silence time at the sentence termination continues a predetermined time or longer, and supplies a start timing of a new sentence to the synchronizer 2730.

Figure 28A:
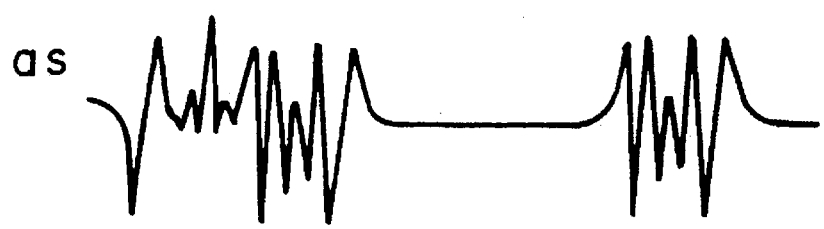
FIG. 28A shows an example of an audio signal waveform.
Figure 28B:
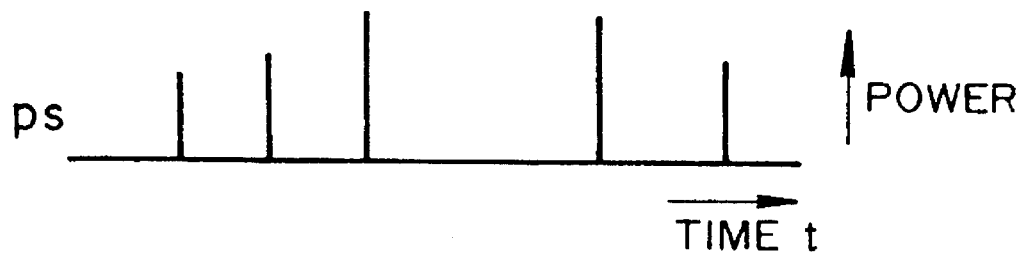
FIG. 28B shows an average sound power signal.

FIGS. 28A and 28B show examples of waveforms of the audio signal as and its average power signal ps.

FIG. 29 is a block diagram showing the structure of the correlation detector 2621. The structures of the correlation detectors 2622 to 2624 have the same structure as the correlation detector 2621.

The correlation detector 2621 has comparators 2940 and 2948, memories 2941 and 2947, a subtractor 2944, an address generator 2945, an address shifter 2946, an absolute value circuit 2935, an integrator 2936, a memory 2942, a minimum value detector 2943, and an evaluation circuit 2901.

Figure 30A:
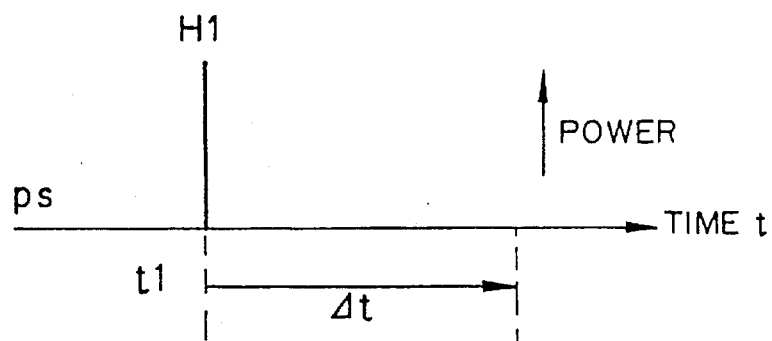
FIGS. 30A and 30B show average audio power signals relative to time.
Figure 30B:
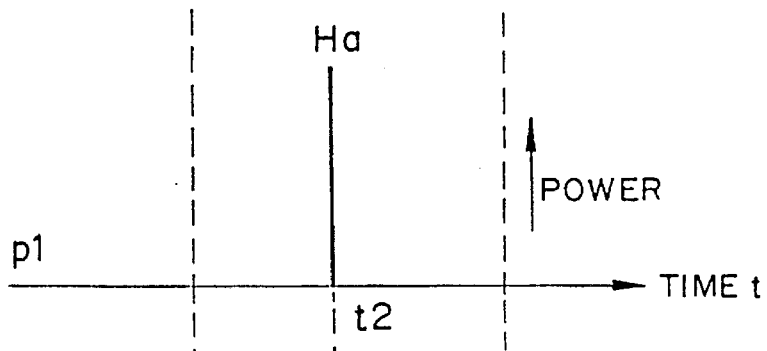

The comparator 2940 compares the value of the average power signal p1 of the audio signal shown in FIG. 30B with a predetermined reference value. If p1>reference value, it is judged to be a significant signal and the value of the average power signal p1 is written in the memory 2941, whereas if p1≦reference value, it is judged to be an insignificant signal and a data value "0" is written in the memory 2941.

Similarly, the comparator 2948 compares the value of the average power signal ps of the audio signal shown in FIG. 30A with a predetermined reference value. If ps>reference value, it is judged to be a significant signal and the value of the average power signal ps is written in the memory 2947, whereas if ps≦reference value, it is judged to be an insignificant signal and a data value "0" is written in the memory 2947.

The address generator 2945 generates a write address WA1 and a reference read address RA1' of the memory 2941, and supplies them to the address shifter 2946. The address generator 2945 also generates a write address WA2 and a read address RA2' of the memory 2947, and supplies them to the memory 2947. The generator 2945 also generates a write address WA3 and a read address RA3 of the memory 2942 and supplies them to the memory 2942 and to the minimum value detector 2943.

The address shifter 2946 supplies the write address WA1 directly to the memory 2941, and generates an actual read address RA1 from the reference read address RA1' and supplies it to the memory 2941 so as to designate an address of data delayed by a shift time Δt from the timing corresponding to the reference read address RA1'.

The subtractor 2944 calculates a difference M between the value of the average power signal P1 read from the memory 2941 and the value of the average power signal Ps read from the memory 2947, and outputs the difference M to the absolute value circuit 2935.

The absolute value circuit 2935 obtains an absolute value of the difference M and outputs |M| to the integrator 2936.

The integrator 2936 integrates the absolute value |M| and writes an integrated value IM to the memory 2942.

The minimum value detector 2943 detects a minimum value ma of the integrated values IM stored in the memory 2942, and detects a delay time τ to the minimum value ma by using the read address RA3.

Figure 30C:
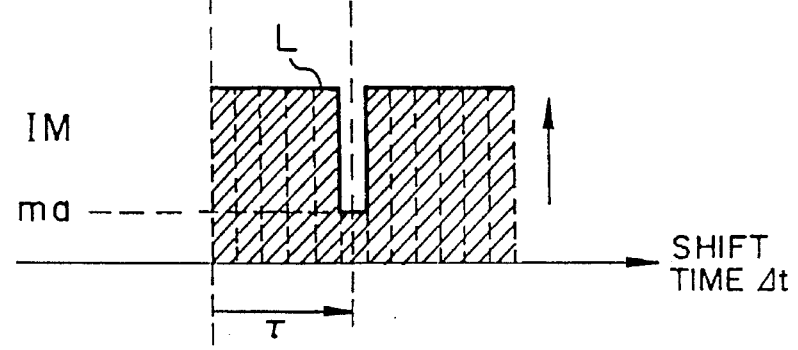
FIG. 30C shows integrated values of the average audio power signals.

For example, it is assumed that the average power signal ps shown in FIG. 30A has a value H1 and the average power signal p1 shown in FIG. 30B has a value Ha. In this case, by changing the shift time Δt, an envelope L shown in FIG. 30C and indicating a change in the integrated value IM is obtained. From this envelope, the minimum value ma and the delay time τ are detected.

The evaluation circuit 2901 evaluates a correlation between the average power signals p1 and ps in accordance with the minimum value ma and delay time τ, and outputs a correlation evaluation signal Q1. Specifically, a correlation is judged to be larger as the minimum value ma is smaller, the detection frequency of the minimum value ma is higher, and the variation of the delay time τ is smaller.

Figure 31:
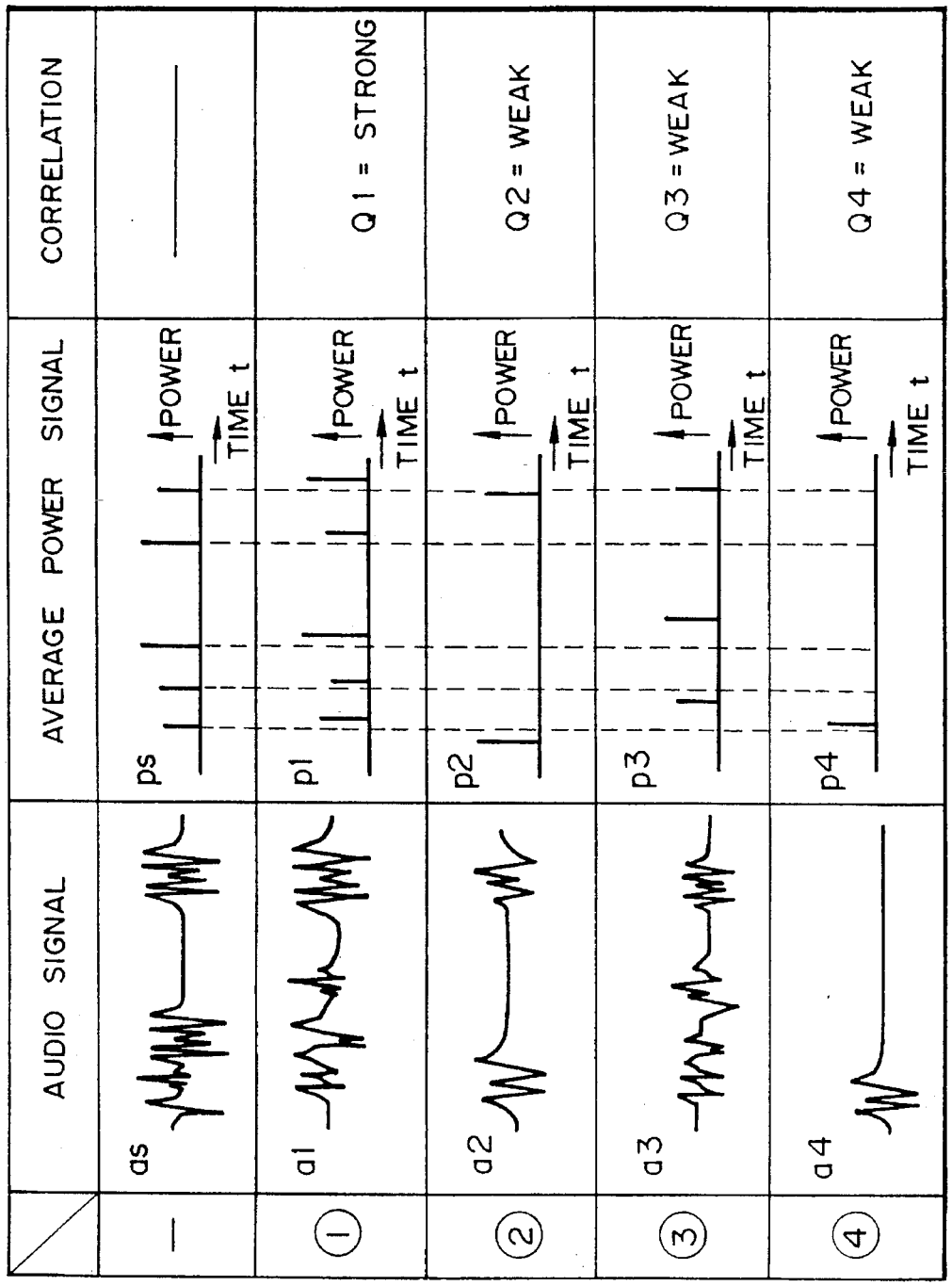
FIG. 31 is a diagram showing a relationship between audio signals, average audio power signals, and correlations.

FIG. 31 shows an example of evaluating a correlation by using audio signals and their average powers.

An audio signal and its average power signal to be used as a comparison subject are represented by as and ps. The audio signals a1 to a4 in FIG. 26 obtained by the AV separators 2205 to 2208 are supplied to the correlation analyzer 2209 whereat the voice detectors 2617 to 2620 calculate the average power signals p1 to p4. The correlation detectors 2621 to 2624 obtain correlations Q1 to Q4 relative to the average power signal ps. In the case where the average power signals shown in FIG. 31 are input to the correlation detectors 2621 to 2624 and the correlations between ps and one of p1 to p4 are shown as Q1 to Q4, the correlation Q1 is largest as shown in FIG. 31. Then, the comparator 2625 outputs a speech partner identifying signal R identifying as a speech partner the TV conferencing site from which the audio signal is transmitted.

Figure 32A:
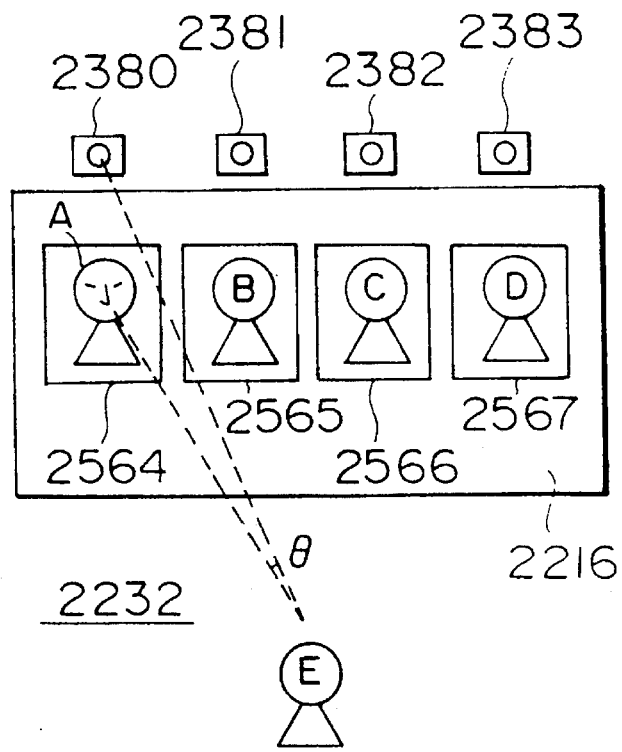
FIGS. 32A and 32B are schematic diagrams showing an agreement of sights of users.

As shown in FIG. 32A, when the TV conferencing apparatus 220 at another site is identified as a speech partner by the speech partner identifying signal R, the system controller 2210 supplies the image pickup signal CC to the image pickup unit 2214 so as to select the video signal of the TV camera 2380 nearest to the window 2564 corresponding to the identified TV conferencing apparatus 2201, from the windows 2564 to 2567 displayed on the screen of the video display unit 2216.

In this manner, the video signal of the TV camera 2380 of the image pickup unit 2214 is supplied.

The participant E at the TV conferencing apparatus 2232 looks toward the window 2564 in which the speech partner participant A is displayed. Therefore, an angle θ between the sight of the participant E and the optical axis of the TV camera 2380 becomes smallest.

Figure 32B:
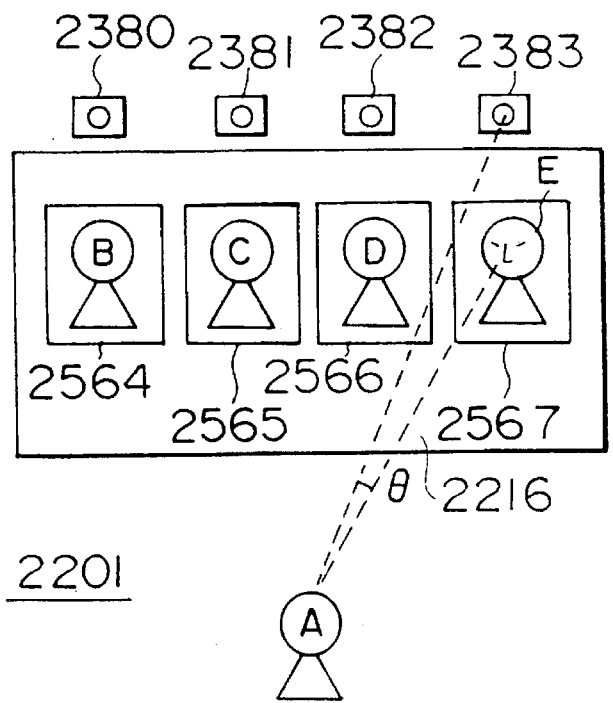

Similarly, at the TV conferencing apparatus 2201, a speech partner for the TV conferencing apparatus 2201 is identified to be the TV conferencing apparatus at another site. Therefore, as shown in FIG. 32B, the video signal from the TV camera 2383 is selected and outputted.

At the TV conferencing apparatus 2201, the participant A looks toward the window 2567 in which the speech partner participant E is displayed. Therefore, an angle θ between the sight of the participant A and the optical axis of the TV camera1 2383 becomes smallest.

In the above manner, both the participants A and E feel that they are looking at each other, providing reality of as if both the partners are discussing at the same conference room.

Figure 33:
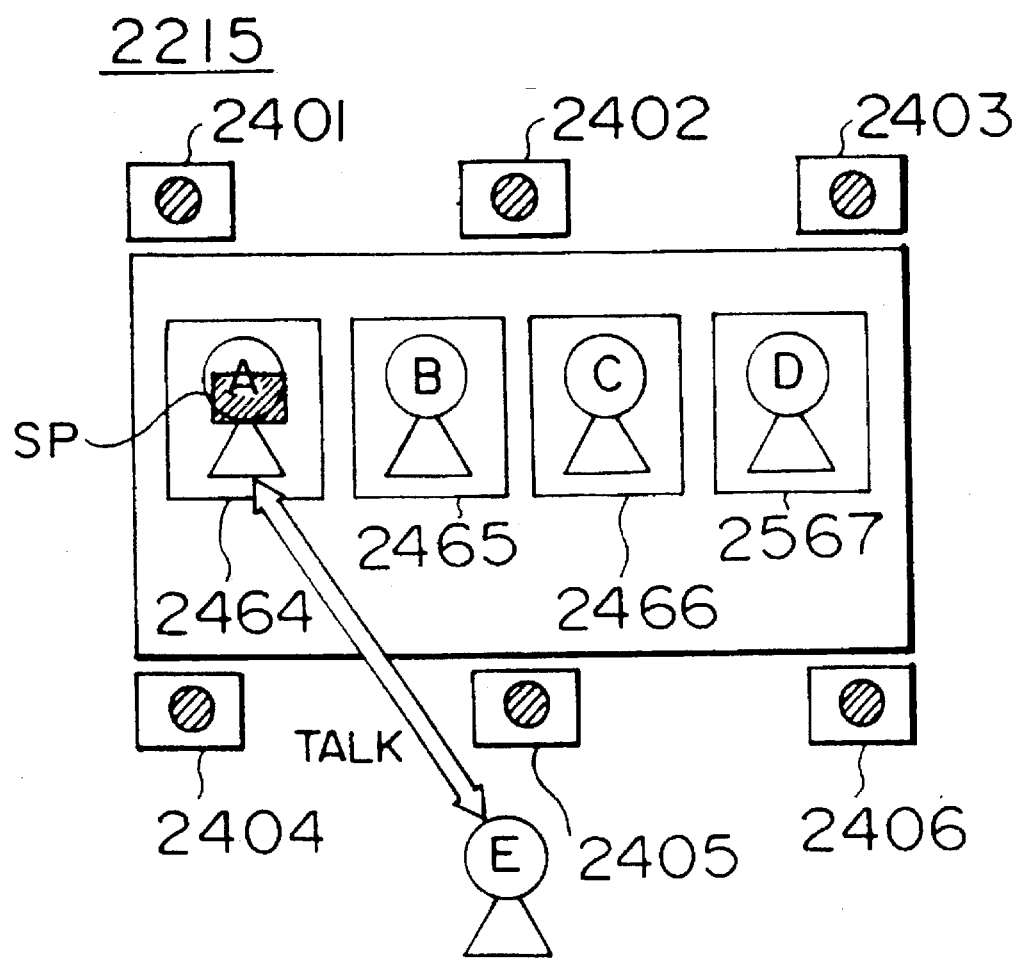
FIG. 33 is a schematic diagram explaining a sound field control.

Furthermore, as shown in FIG. 33, at the TV conferencing apparatus 2232, the system controller 2210 shown in FIG. 22 supplies the audio signal control signal CA to the audio signal processor 2211 so as to localize the sound image to the central area SP of the window 2464 in which the speech partner participant A is displayed. In localizing the sound image, the balance, phase, and delay of sounds reproduced from the loudspeakers 2401 to 2406 are controlled or a convolution calculation is performed.

Similarly, at the TV conferencing apparatus 2201, the sound field is orientated to the center of the window 2567 in which the speech partner participant E is displayed.

With this embodiment, each TV conferencing apparatus at each site can identify its speech partner and select the camera so as to coincide the sight with the partner sight, and in addition the sound field moves. It is therefore possible to obtain reality as if both parties are facing each other in the same conference room.

Figure 34:
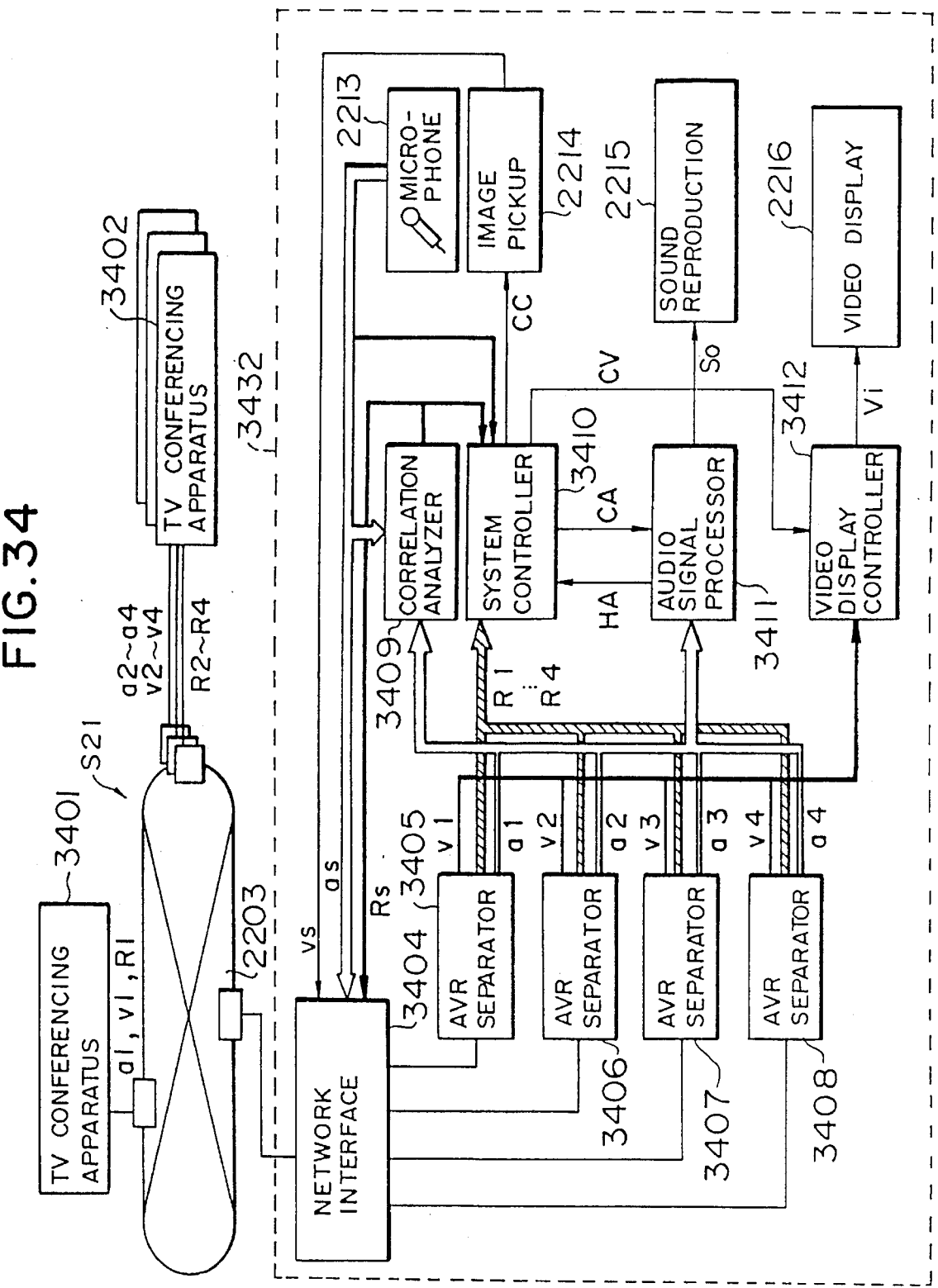
FIG. 34 is a block diagram showing the structure of an embodiment of the invention.

FIG. 34 is a block diagram showing the outline of a TV conferencing system S21 according to another embodiment of the invention.

In this TV conferencing system S21, individual-type TV conferencing apparatuses 3401, 3402, ..., 3432 are installed at a plurality of sites on a communication network 2203, and audio signals a and video signals v are transferred between these TV conferencing apparatuses 3401 to 3432.

These apparatuses 3401 to 3432 have the same structure, and only the structure of the TV conferencing apparatus 3432 is shown in FIG. 34.

The TV conferencing apparatus 3432 has a network interface unit 3404, AV separators 3425 to 3408, a correlation analyzer 3409, a system controller 3410, an audio signal processor 3411, a video display controller 3412, a microphone 2213, an image pickup unit 2214, a sound reproduction unit 2215, and a video display unit 2216. The structure and operation of the correlation analyzer 3409 are basically the same as the correlation analyzer 2209.

The network interface unit 3404 generates an AVR signal from an audio signal as picked up by the microphone 2213, a video signal vs recorded by the image pickup unit 14, and a speech partner identifying signal Rs, and transmits the AVR signal to the communication network 3403. AVR signals transmitted from the other TV conferencing apparatuses 3401, 3402, ..., 3431 to the TV conferencing apparatus 3432 are received via the communication network 3403 and separated for each of the TV conferencing apparatuses 3401, 3402, ..., 3431 and outputted to corresponding ones of the AV separators 3405, 3406, ..., 3408.

The AV separator 3405 separates the AVR signal transmitted from the TV conferencing apparatus 3401 into an audio signal a1, a video signal v1, and a speech partner identifying signal R1, the audio signal a1 being supplied to the correlation analyzer 3409 and to the audio signal processor 3411, the video signal v1 being supplied to the video display controller 3412, and the speech partner identifying signal R1 being supplied to the system controller 3410.

The other AV apparatuses 3406 to 3408 perform similar operations.

The correlation analyzer 3409 analyzes correlations between the audio signal as generated at its TV conferencing apparatus 3432 and audio signals a1 to a4 received from the other TV conferencing apparatuses 3401, 3402, ..., 3431, identifies the other TV conferencing apparatus having the largest correlation as a speech partner, and outputs a speech partner identifying signal R to the system controller 3410 and to the network interface unit 3404.

The audio signal processor 3411 analyzes the audio signals a1 to a4 to judge which one of the other TV conferencing apparatuses is now operating for speech transmission. If under speech transmission, the other TV conferencing apparatus under speech transmission is informed to the system controller 3410 by using a speaker notice signal HA, and at the same time an audio signal reproduction signal So is generated and outputted to the sound reproduction system 2215 so as to localize a sound image to the window in which the speaker is displayed. On the other hand, if there is no other TV conferencing apparatus at another site under speech transmission, the fact that there is no other TV conferencing apparatus at another site under speech transmission is informed to the system controller 3410 by using the speaker notice signal HA, and at the same time, similar to the above-described embodiment, in response to the audio signal control signal CA supplied from the system controller 3410, the audio signal reproduction signal So is generated and outputted to the sound reproduction system 2215.

If the system controller 3410 judges from the audio signal as that the TV conferencing apparatus 3432 at its own site is operating for speech transmission and is informed of the fact that there is no TV conferencing apparatus at another site by the speaker notice signal HA, then the image pickup control signal CC is outputted to the image pickup unit 2214 so as to select the TV camera nearest to the window in which the speech partner of the TV conferencing apparatus 3432 at its own site. On the other hand, if the TV conferencing apparatus 3432 at its own site is not under speech transmission and the fact that there is the TV conferencing apparatus at another site is informed by the speaker notice signal HA, the image pickup control signal CC is outputted to the image pickup unit 2214 so as to select the TV camera nearest to the window in which the speaker is displayed.

The system controller 3410 also outputs the image pickup control signal CA to the audio signal processor 3411 in response to the speech partner identifying signal Rs.

In addition to the above, if the system controller 3410 judges from the audio signal as that the TV conferencing apparatus 3432 at its own site is operating for speech transmission and is informed of the fact that there is no TV conferencing apparatus at another site by the speaker notice signal HA, then a video display control signal CV is outputted to the video display controller 3412 so as to display the video signal from the TV conferencing apparatus of the speech partner of the TV conferencing apparatus 3432 at its own site at a high resolution and to display the video signal from the TV conferencing apparatuses at other sites at a low resolution. On the other hand, if the TV conferencing apparatus 3432 at its own site is not under speech transmission and the fact that there is the TV conferencing apparatus at another site is informed by the speaker notice signal HA, then the speech partner is identified by using the speech partner identifying signal R transmitted from the TV conferencing apparatus. If the partner is not for the TV conferencing apparatus at its own site, then the video display control signal CV is outputted to the video display controller 3412 so as to display the video signals from the other TV conferencing apparatuses for the speaker and speech partner at a high resolution, and display the video signals from the remaining other TV conferencing apparatuses at a low resolution. If the partner is for the TV conferencing apparatus at its own site, the video display control signal CV is outputted to the video display controller 3412 so as to display the video signal from the other TV conferencing apparatus for the speaker at another site at a high resolution, and display the video signals from the remaining other TV conferencing apparatuses at a low resolution.

Figure 35:
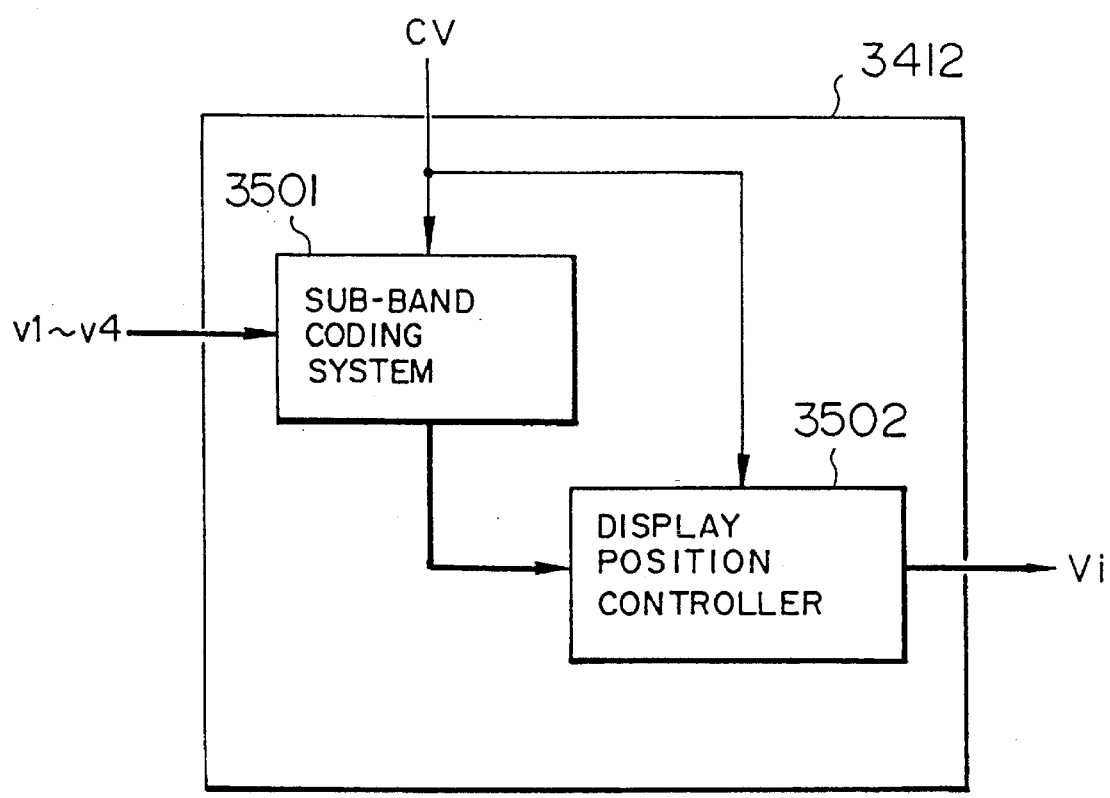
FIG. 35 is a block diagram showing the structure of a video display controller.

FIG. 35 shows the structure of the video display controller 3412.

The video display controller 3412 has a sub-band coding system 3501 and a display position controller 3502. The sub, band coding system 3501 decodes the video signals v1 to v4 encoded by a hierarchical encoding method such as a sub-band encoding method. The display position controller 3502 controls to determine the display positions of the decoded video signals v1 to v4.

The sub-band encoding system 3501 controls the resolution easier than a block coding system such as discrete cosine transformation (DCT). With this sub-band encoding system 3501, the image in the window designated by the video display control signal CV is displayed at a high resolution (by increasing the number of hierarchical levels) and the image in the window not designated is displayed at a low resolution (by decreasing the number of hierarchical levels).

Figure 36A:
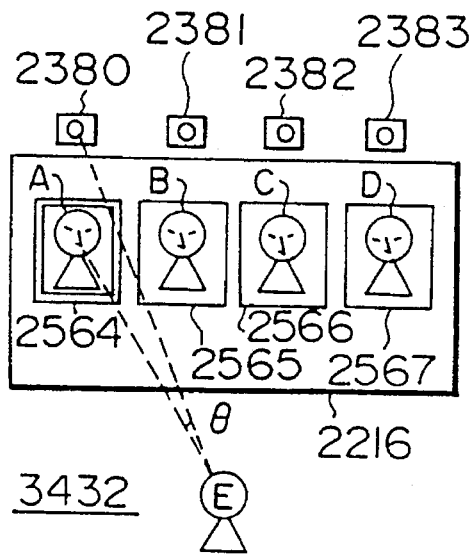
FIGS. 36A, 36B, and 36C are schematic diagrams showing an agreement of sights of users.
Figure 36B:
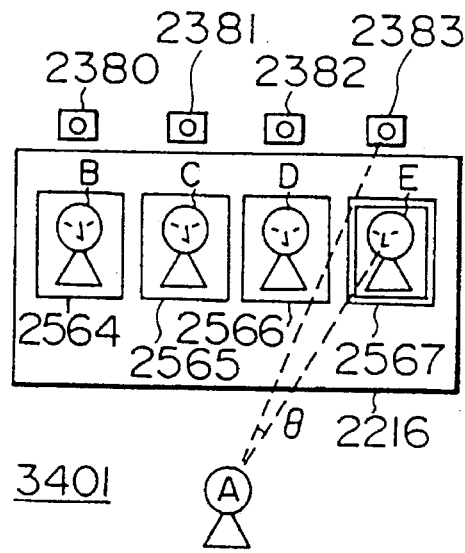
Figure 36C:
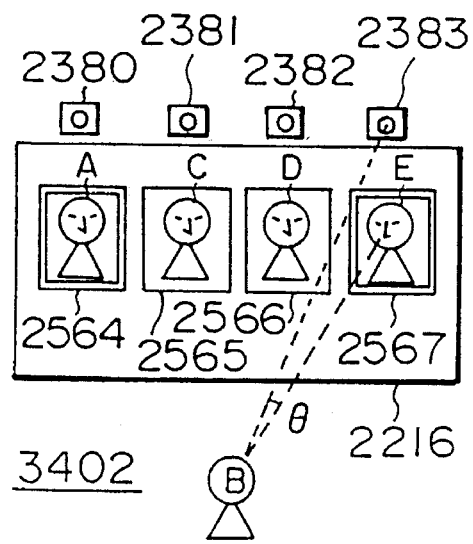
Figure 37:
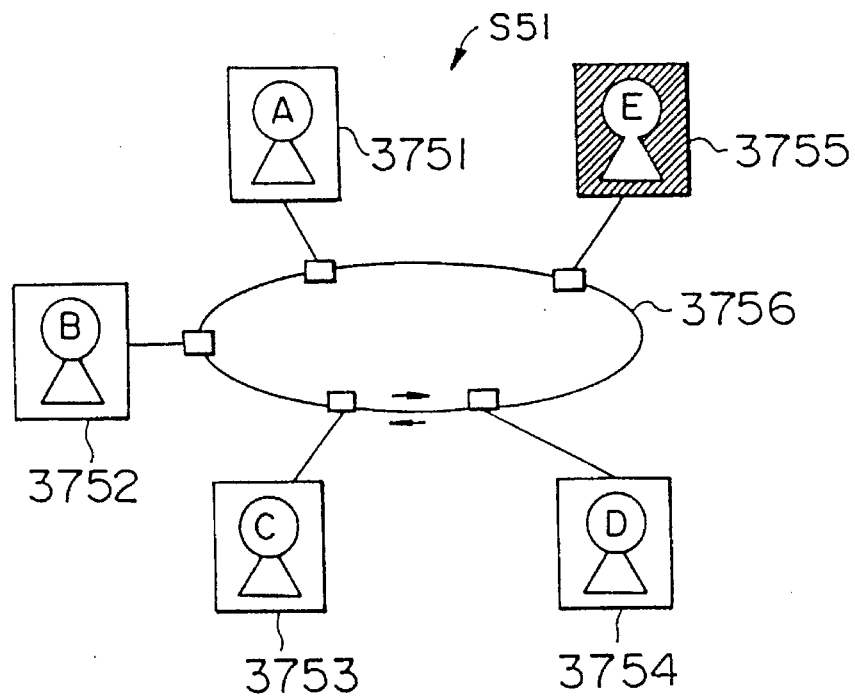
FIG. 37 is a schematic diagram showing the structure of a conventional multi-site TV conferencing system.
Figure 38:
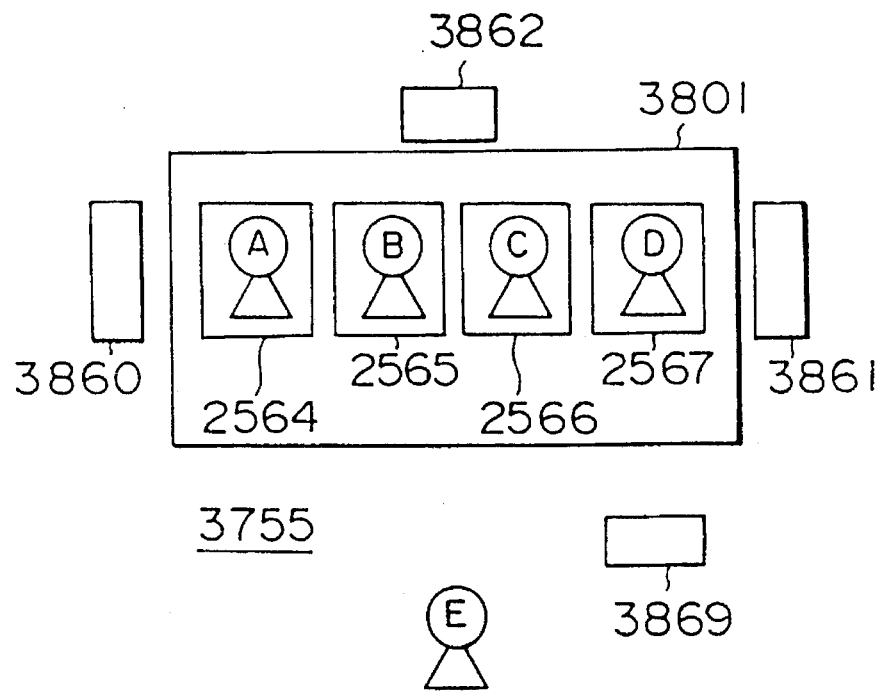
FIG. 38 is a schematic diagram showing a conventional TV conferencing apparatus.
Figure 39A:
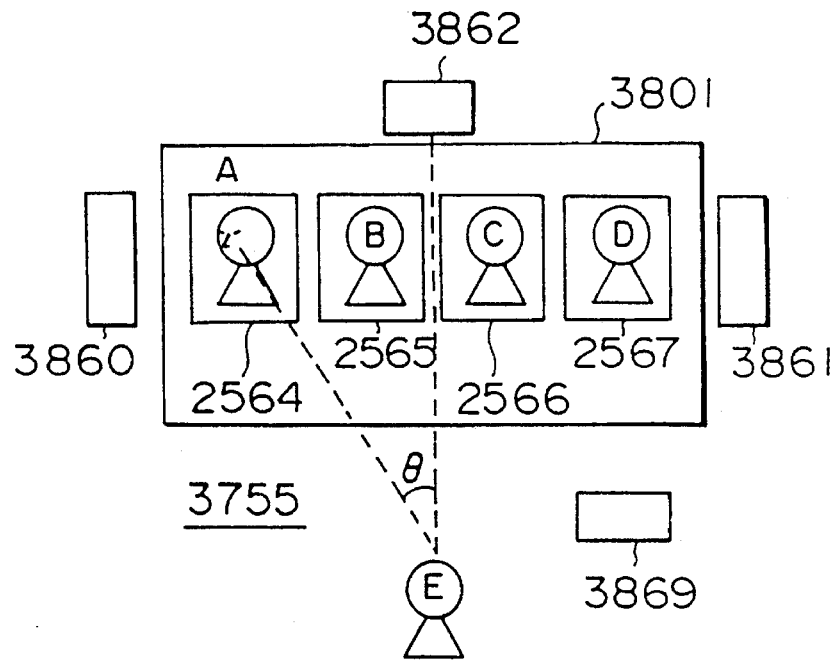
FIGS. 39A and 39B are schematic diagrams showing a disagreement of sights of users.
Figure 39B:
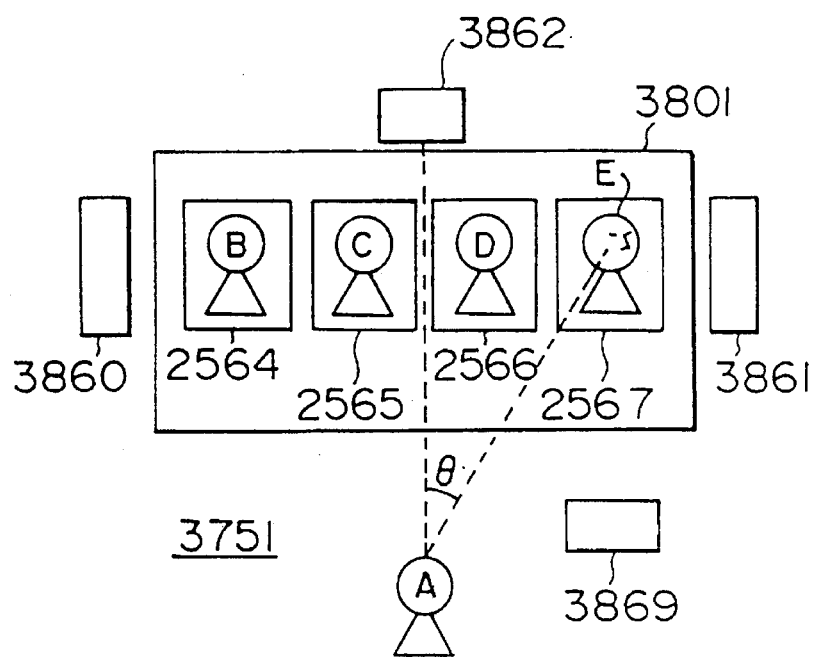

FIGS. 36A to 36C show displays on the screens of the TV conferencing apparatuses 3432, 3401, and 3402 in which the participant E at the TV conferencing apparatus 3432 speaks to the participant A at the TV conferencing apparatus 3401.

As shown in FIG. 36A, at the TV conferencing apparatus 3432, the TV camera 2380 is selected which is nearest to the window 2564 corresponding to the TV conferencing apparatus 3401 for the speech partner. The window 2564 is displayed at a high resolution and the other windows 2565 to 2567 are displayed at a low resolution.

As shown in FIG. 36B, at the TV conferencing apparatus 3401, the TV camera 2383 is selected which is nearest to the window 2567 corresponding to the TV conferencing apparatus 3432 for the speaker, and the sound image is localized to the particular loudspeaker. The window 2567 is displayed at a high resolution and the other windows 2564 to 2566 are displayed at a low resolution.

As shown in FIG. 36C, at the TV conferencing apparatus 3402, the TV camera 2383 is selected which is nearest to the window 2567 corresponding to the TV conferencing apparatus 3432 for the speaker, and the sound field is orientated to the particular loudspeaker. The window 2567 and the window 2564 corresponding to the TV conferencing apparatus 3401 for the speech partner are displayed at a high resolution and the other windows 2565 and 2566 are displayed at a low resolution According to this embodiment, the images of participants to a conversation are displayed at a higher resolution than the other participants so that the participants to the conversation are highlighted to improve reality of the conversation.

Instead of controlling the hierarchical decoding level, the hierarchical encoding level may be controlled. For example, in the case of a sub-band coding system, the video signals vs to a higher level bandwidth is transmitted from the TV conferencing apparatuses for conversation participants, and the video signals vs only of a lower level bandwidth are transmitted from the TV conferencing apparatuses for other participants. With this arrangement, the information transmission efficiency of the communication network 2203 can be improved.

What is claimed is:

1. An apparatus for integrally controlling in real time an audio signal and a video signal transmitted in real time, comprising:

a separator for receiving a video signal and an audio signal synchronous with said video signal and separating the received signals into said audio and video signals;

a display unit for displaying said video signal;

a sound output unit for outputting a sound of said audio signal; and a control means for processing and controlling the output state of said audio signal in accordance with said video signal, said processing and controlling being conducted before said outputting of said audio signal.

2. An apparatus according to claim 1, wherein said control means includes a video analyzer for analyzing said video signal, and a table for storing a relationship between an output from said video analyzer and the output state of said audio signal, whereby said sound output unit is controlled by an output from said table.

3. An apparatus according to claim 1, wherein said control means includes a video analyzer for analyzing said video signal and detecting a discontinuity of said video signal, and a table for storing a relationship between an output from said video analyzer and the output state of said audio signal, whereby said sound output unit is controlled by an output from said table.

4. An apparatus according to claim 1, wherein said control means includes an audio signal analyzer for analyzing said audio signal, and a table for storing a relationship between an output from said audio signal analyzer and the output state of said video signal, whereby said display unit is controlled by an output from said table.

5. An apparatus according to claim 1, wherein said control means includes a means for controlling to change said video signal to an icon and display said icon on said display unit, and a table for storing a relationship between a level of said audio signal and a display size of said icon.

6. An apparatus according to claim 1, wherein said control means includes a means for controlling to change said video signal to an icon and display said icon on said display unit, and a table for storing a relationship between a level of said audio signal and a display color of said icon.

7. An apparatus for integrally controlling an audio signal and a video signal in real time, comprising:

a separator for receiving a video signal and an audio signal synchronous with said video signal and separating the received signals into said audio and video signals;

a display unit for displaying said video signal;

a sound output unit for outputting a sound of said audio signal;

a control means for controlling the output state of one of said audio and video signals in accordance with the other of said audio and video signals;

a microphone; and an image pickup means;

wherein a composite signal of said video signal and said audio signal synchronous with said video signal is received via a network interconnecting communication terminals at other sites, and said control means includes a correlation analyzing means for analyzing a correlation between said audio signal supplied from said network and said audio signal obtained from said microphone, and controls said display unit, said sound output unit, and said image pickup means, in accordance with an output from said correlation analyzing means.

8. An apparatus according to claim 7, wherein said control means controls an image pickup angle of said image pickup means.

9. An apparatus according to claim 7, further comprising a plurality of sound output units, wherein said control means controls a balance of reproduced sounds of the plurality of sound output units to orientate a sound field to a display screen area at which said video signal synchronizing said audio signal having a largest correlation is displayed.

10. An apparatus according to claim 9, wherein said display unit displays said composite signal of said video signal and said audio signal synchronous with said video signal in a window, and said control means controls the balance of reproduced sounds of the plurality of sound output units and controls to display, in a different manner from an ordinary state, the window in which said video signal synchronizing said audio signal having a largest correlation is displayed.

11. A multi-site communication method for a multi-site communication system having a plurality of communication terminals at different sites interconnected by a communication network for transmitting an audio signal and a video signal between the communication terminals, wherein correlations between an audio signal generated at one communication terminal and audio signals generated at other communication terminals are analyzed, and a conversation partner of said one communication terminal is identified from said other communication terminals in accordance with a result of an analyzed correlation.

12. A multi-site communication method according to claim 11, wherein said one communication terminal includes a display unit for displaying images received from said other communication terminals at predetermined display positions and a plurality of cameras disposed near said predetermined display positions for taking images of participants at said other communication terminals, and wherein said video signal recorded by a camera near a predetermined display position corresponding to said identified conversation partner is selected and transmitted at least to said communication terminal of said identified conversation partner.

13. A multi-site communication method according to claim 12, wherein a display state of an image is controlled in accordance with identification of said conversation partner.

14. A multi-site communication method according to claim 13, wherein contents of image decoding are controlled in accordance with identification said conversation partner.

15. A multi-site communication method according to claim 13, wherein contents of image encoding are controlled in accordance with identification of said conversation partner.

16. A multi-site communication method according to claim 14, wherein the image decoding includes a hierarchical decoding scheme, and a hierarchy thereof is changed in accordance with said identification of conversation partner.

17. A multi-site communication method according to claim 11, wherein a reproduction state of audio signal sounds is controlled in accordance with identification of said conversation partner.

18. A communication terminal connected to a plurality of other communication terminals at different sites via a communication network for transmitting and receiving an audio signal and a video signal to and from the plurality of other communication terminals, comprising:

a correlation analyzing means for analyzing correlation between said audio signal to be transmitted to another communication terminal at another site and audio signals received from said other communication terminals at the different sites; and a conversation partner identifying means for identifying the another communication terminal of a conversation partner in accordance with an output of said correlation analyzing means.

19. A communication terminal according to claim 18, further comprising:

a display unit for displaying images received from said other communication terminals at predetermined display positions;

a plurality of cameras disposed near said predetermined display positions for taking the images of participants at said other communication terminals; and a video signal selecting means for selecting said video signal recorded by a camera near a predetermined display position corresponding to an identified conversation partner.

20. A communication terminal according to claim 18, further a comprising video controlling means for controlling a display state of an image in accordance with identification of said conversation partner.

21. A communication terminal according to claim 18, further comprising a conversation partner identified result transmitting means for transmitting identification of said conversation partner to said other communication terminals via said communication network.

22. A communication terminal connected via said communication network to a plurality of communication terminals including the communication terminal recited in claim 21, further comprising:

a conversation partner identified result receiving means for receiving the identification of said conversation partner from said communication network; and a video signal decoding control means for controlling contents of decoding said video signal in accordance with the identification received by said result receiving means.

23. A communication terminal according to claim 18, further comprising a video signal encoding control means for controlling contents of encoding said video signal in accordance with identification of said conversation partner.

24. A communication terminal according to claim 22, wherein said video signal decoding control means changes a hierarchy of a hierarchical decoding scheme in accordance with the identification said conversation partner.

25. A communication terminal according to claim 18, further comprising a sound controlling means for controlling a sound reproduction in accordance with identification of said conversation partner.

* * * * *